Dec. 10, 1963 W. A. WEBB ETAL 3,113,915
SHIELDED REACTOR PLANT ARRANGEMENT AND
PERSONNEL ACCESS MEANS THEREFOR
Filed May 14, 1957 9 Sheets-Sheet 2

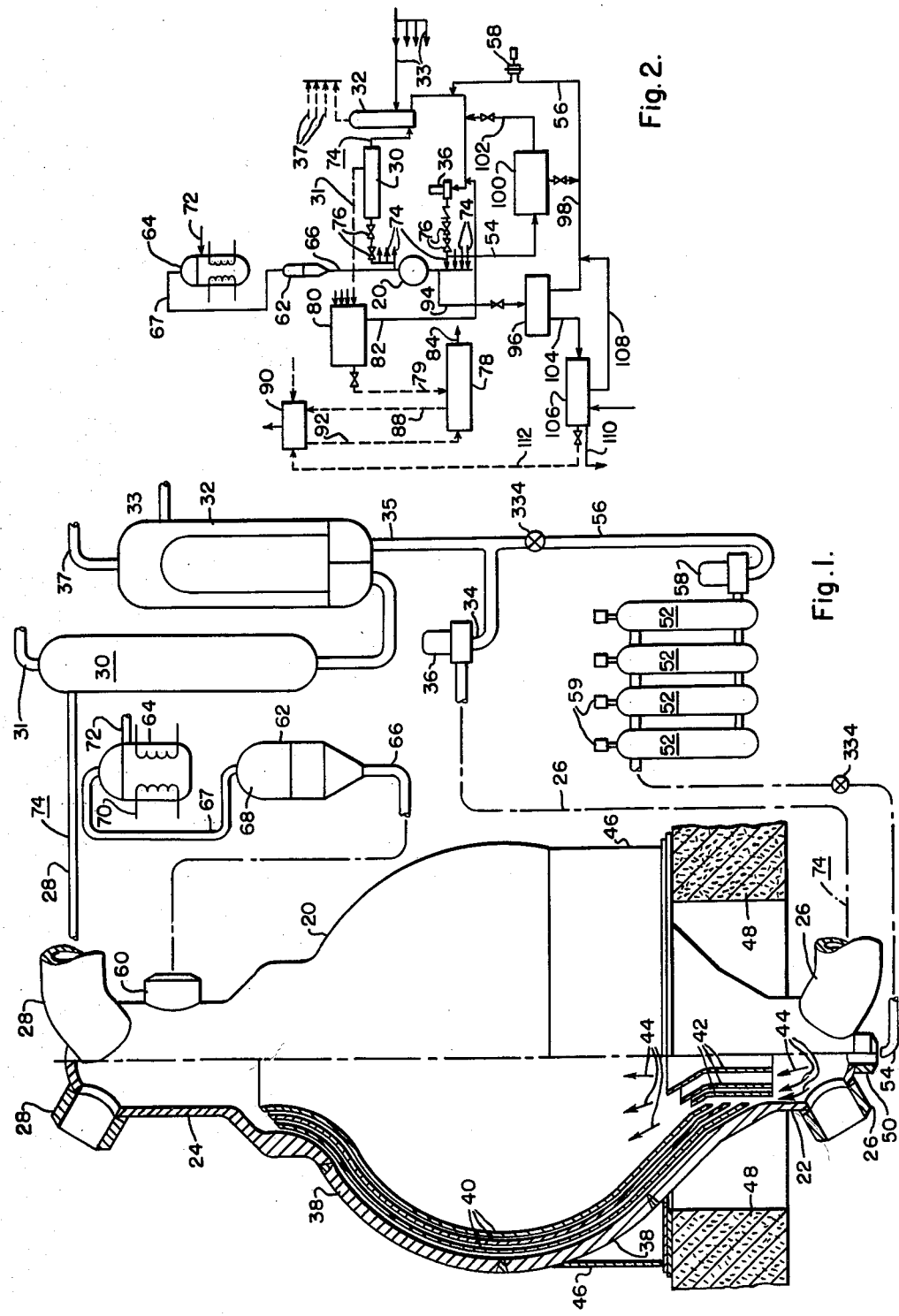

WITNESSES
Edwin E. Bassler
Donald H. Smith

INVENTORS
William A. Webb,
Walter P. Haass,
John R. Huston &
Woodrow E. Johnson
BY Arthur T. Stratton
ATTORNEY

United States Patent Office 3,113,915
Patented Dec. 10, 1963

3,113,915
SHIELDED REACTOR PLANT ARRANGEMENT AND PERSONNEL ACCESS MEANS THEREFOR
William A. Webb, Penn Township, Allegheny County, John R. Huston, Penn Township, Westmoreland County, Walter P. Haass, Wilkinsburg, and Woodrow E. Johnson, Whitehall, Pa., assignors to Westinghouse Electric Corporation, East Pittsburgh, Pa., a corporation of Pennsylvania
Filed May 14, 1957, Ser. No. 659,004
9 Claims. (Cl. 204—193.2)

The present invention relates to a plant layout arrangement adapted for use with highly radio-active processes and more particularly to a plant arrangement of the character described adapted for use with a homogeneous nuclear reactor system.

In a plant arrangement of considerable size and adapted for use with radioactive materials, it is desirable to provide biologically shielded means associated with the plant arrangement to permit accessibility thereto of maintenance personnel for purposes of servicing equipment, instrumentation, and the like associated with the plant. In many cases, even though the radioactive plant has been shut down for a considerable time, the residual radioactivity associated therewith prohibits the entry of maintenance personnel for a length of time sufficient for proper servicing of the plant equipment. This results from the fact that in many cases long-lived radioisotopes are employed in the processes being carried out within plant or are formed in certain structural components of the plant as a result of radiation by subatomic particles frequently associated with the aforementioned radioactive processes. In some types of radioactive plants, the avoidance of shutting down the processes being carried on therein is highly desirable due to the length of time involved in initiating and terminating the processes. The aforementioned time is extended by the fact that highly pressurized equipment frequently is associated with the aforesaid radioactive processes and therefore carefully controlled thermal cycling is mandatory in order to prevent undue thermal stresses from being developed in the equipment. Accordingly, it is desirable to provide a plant arrangement wherein access to at least some of the equipment associated therewith is afforded during operation of the plant or at least immediately after shutting down the plant.

When arranging a radioactive plant, it has been found desirable, for purposes of maintenance and shielding the equipment, to group the equipment more or less according to radiation levels within the plant. Equipment grouping in this manner facilitates biologically shielding the equipment thus arranged and affords direct or at least semi-remote access to the shielded cells or compartments in which the equipment is contained. It has also been found that when grouping the equipment in this fashion, that is to say, in accordance with the level of radioactivity associated therewith, that such grouping is best arranged in accordance with the "roentgen equivalent man" values of radiation levels associated with the equipment, rather than in accordance with the "roentgen equivalent physical" values. These terms are well defined in the literature; suffice it to say, however, that the aforesaid equipment groups are arranged not in accordance with the absolute values of their attendant radioactivities, but rather in accordance with the biological hazards associated therewith.

As indicated previously, the exceedingly high levels of radioactivity associated with certain radioactive processes prohibits entry of personnel into the plant for maintenance purposes. On the other hand, due to the considerable expense involved in shutting down these radioactive processes, a further reason is found for effecting maintenance of the associated plant in as quick and efficient manner as possible. Accordingly, it is desirable to arrange the plant such that at least some of the equipment thereof can be removed completely therefrom for maintenance in a "hot cell" or external, biologically shielded enclosure and similar equipment substituted therefor in order to minimize operational delays. When so removed, the equipment can be serviced in an unhurried manner in the aforesaid hot cell by remote or semi-remote means, as desired.

In the case of the nuclear power plant, the tremendous radioactivity associated therewith complicates the aforedescribed problems still further. In this type of radioactive plant, a plurality of primary circulating loops are coupled to a reactor vessel, and maintenance thereof is rendered still more difficult as a result of the required biological shielding and the complex equipment associated with each of the loops. Since it is possible in some types of nuclear power plants to operate the reactor, with one of the circulating loops being shut down or isolated from the system, it is highly desirable to afforded means for individually maintaining at least some of the equipment associated with each loop while the reactor plant is in operation.

In the case of the homogeneous nuclear reactor system presently to be described, the circulating nuclear fuel which, of course, is passed through each of the circulating loops and through certain auxiliary equipment renders the loops and auxiliary equipment extremely radioactive. This radioactivity is caused not only by the presence of a circulating nuclear fuel, presently to be described, containing a certain amount of highly radioactive fission products, but also due to the formation of hazardously radioisotopes within the structural components of the aforesaid equipment. One example of the aforesaid radioisotopes is the long-lived isotope cobalt 60 formed in stainless steel cladding or structural components associated with the nuclear power plant.

In view of the foregoing, an object of the invention is the provision of improved radioactive plant personnel shielding means.

Still another object of the invention is the provision of efficient radioactive plant layout arrangement.

Another object of the present invention is the provision of means associated with a radioactive plant arrangement for affording at least limited access for maintenance personnel in those areas of the plant having a high level radioactivity.

Another object of the invention is to provide a radioactive plant arrangement with means for admitting maintenance personnel thereto during operation of the plant.

A further object of the invention is to provide means associated with a radioactive plant for enclosing certain non-radioactive operating controls, instrumentation, and the like for access thereto by personnel during operation of the plant especially in those areas of the plant which are normally highly radioactive.

Still another object of the invention is to provide a radioactive plant arrangement whose equipment is segregated and shielded in accordance with the type and level of radioactivity thereof.

A still further object of the invention is to provide a radioactive plant with means for quickly and efficiently replacing or substituting at least some of the equipment employed therein.

A further object of the invention is the provision of a radioactive plant arrangement adapted for use with a nuclear power plant and more particularly one employing a homogeneous type reactor system.

Still another object of the invention is to provide plant access means having its own atmosphere for shielding maintenance personnel from the radioactive air confined within the vapor container frequently employed in a nuclear reactor plant.

Other objects, features and advantages of the invention will be made apparent during the ensuing description thereof, with the description being taken in conjunction with the accompanying drawings wherein:

FIGURE 1 is a schematic and elevational view, partially sectioned, of one form of homogeneous type reactor vessel shown in conjunction with primary coolant loop circuitry;

FIG. 2 is a schematic fluid circuit diagram of the homogeneous reactor system illustrated in FIG. 1 as arranged for use with certain auxiliary equipment;

Figure 3:
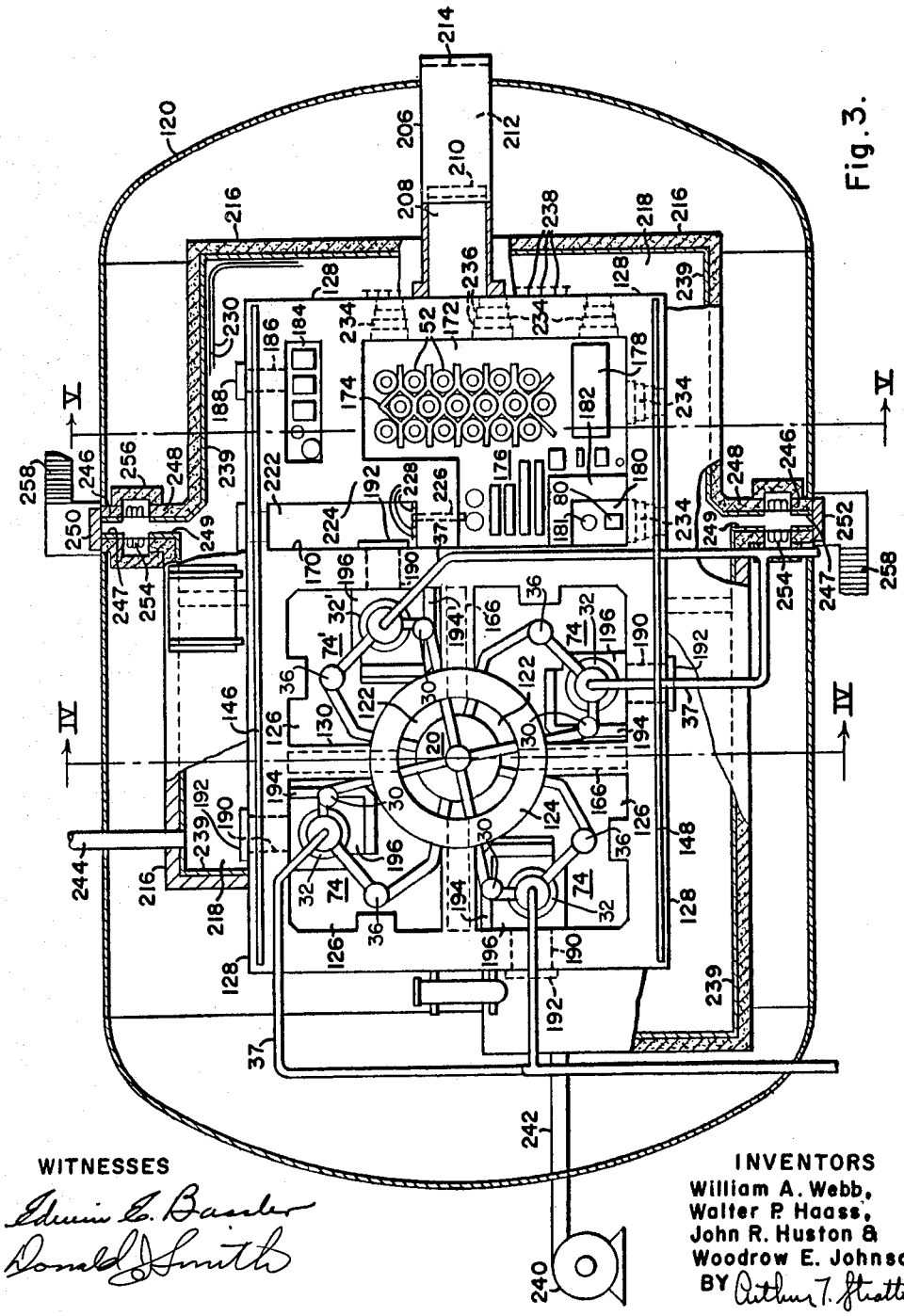
FIG. 3 is a top plan view, partially in section, of an exemplary radioactive plant arrangement as taught by the invention and shown in conjunction with a homogeneous reactor system such as that illustrated in FIGS. 1 and 2 of the drawings.

In accordance with the invention, a highly radioactive plant arrangement is provided with inhabitable areas or access passageways within the radioactive plant, with the areas being biologically shielded from the remainder of the plant. In the case of a nuclear power plant, which usually is sealed within a vapor container presently to be described, these access passageways desirably are completely sealed from the container atmosphere, whereby maintenance personnel entering the passageways are shielded from actual and radiational contact with the container atmosphere. This atmosphere, during operation of the plant becomes dangerously radioactive due principally to the formation of a radioisotope of argon component by neutronic irradiation.

The aforementioned passageways serve an additional function of enabling the plant equipment to be observed directly during operation of the plant from the passageways by means of suitably placed shielding windows, periscopes, and the like. In many cases, the use of remotely indicating and controlling instrumentation thereby is obviated, and instead, suitable local instrumentation can be either installed in or operated or observed from within the passageways. It is also contemplated that non-radioactive plant components such as equipment cooling and purging water lines, service air and steam, and instrumentational connections can be located within the access passages to permit direct and convenient maintenance thereof during operation of the plant. It is further contemplated that directly connected master-slave manipulators can be controlled from within the passageways in a manner, for example, similar to that described in connection with the remote equipment maintenance arrangement described in a copending application of William A. Webb et al., entitled "Remote Equipment Maintenance," Serial No. 659,002, filed May 14, 1957, assigned to the assignee of the present application, and now abandoned.

It is further contemplated by the invention that the equipment associated with the radioactive plant be segregated for maintenance purposes in accordance with the type and level of radiation associated therewith. For an example, in the case of a nuclear power plant or other highly radioactive processes yielding neutronic radiations, the neutron-emitting equipment is segregated into compartments separated from the non-neutron emitting equipment to prevent induced radiation within the last-mentioned equipment. Although the use of suitable biological shielding has been employed previously for radiational attenuation between the radioactive plant interior and the external walls thereof, the present invention accomplishes such radiational attenuation not only to the plant exterior but between suitably arranged plant equipment compartments or cells as well. Accordingly, maintenance and operating personnel can enter certain areas of the plant without encountering radiation from other areas thereof.

In order to effect installation and servicing or maintenance of certain radioactive plant equipment within a minimum time, there are provided in accordance with the invention, means for grouping certain equipment of the plant into a packaged unit which can be readily and remotely assembled or connected to other components of the plant. Thus, when it is desired to maintain or service the packaged unit or any portion thereof, the unit is removed entirely from the radioactive plant by remotely operated means and a similar packaged unit is substituted therefor to minimize plant operational delays. The removed packaged unit then is carried to an external shielded enclosure or hot cell where the individual components thereof can be removed or repaired by remotely operated means. Desirably, the equipment associated with the aforementioned packaged unit is aggrouped according to similarity of function and radiational level, as proposed heretofore.

The radioactive plant layout arrangement, disclosed herein, is adapted in an exemplary application thereof for use with a homogeneous type reactor system such as that illustrated in FIGS. 1 and 2 of the drawings.

Generally speaking, in a homogeneous-type reactor system the nuclear fuel is contained within the system in a fluid form, which in some cases may be a gaseous or liquid compound of at least one of the fissile or fertile isotopes noted below. In other cases, the fluid fuel comprises a suspension in a suitable vehicle of a pulverulent form of the fissile or fertile isotopes, or compounds thereof, or a solution of at least one of these compounds. As explained hereinafter, the fluid fuel is circulated through a reactor vessel, by one or more primary circulating loops including suitable pumping means. The fluid fuel, including the vehicle or solvent serving both as coolant and moderator, thus circulates through both the vessel and the circulating loops in contradistinction to a heterogeneous-type reactor wherein the fuel, the moderator, and the coolant usually are physically separated and at least the fuel is contained in solid form entirely within the reactor vessel.

The homogeneous reactor vessel is fabricated of such size and shape that the quantity of circulating fluid fuel contained therein is equivalent to the critical mass of the fuel and consequently a self-sustaining chain reaction is established within the vessel. As pointed out hereinafter the remaining components of the system are insufficient in size and are suitably spaced or shielded such that a critical mass cannot be accumulated elsewhere in the system. The heat developed within the circulating fuel as a result of the nuclear chain reaction is removed from the fuel as it circulates through the primary loops by suitable heat exchanging means coupled within each of the loops.

The vehicle or solvent employed with the circulating fuel, which may be ordinary water ($H_2O$), heavy water ($D_2O$), or an organic material having the desired characteristics of temperature and radiation stability, serves as a moderator for the chain reaction in addition to a heat transfer medium, as noted heretofore. As is well-known, a moderator material usually is employed adjacent the nuclear fuel to slow the fast neutrons produced by each fission to thermal velocities, whereat the neutrons are most efficient for inducing fission in atoms comprising the fissile isotope. The moderator material appropriately possesses the characteristics of low neutronic capture cross section and a high scattering cross section. Suitable materials for these purposes include carbon and the vehicles and solvents noted heretofore, i.e., light and heavy water, and the organic materials which of course contain carbon.

When once initiated, the chain reaction is controlled inherently by the negative temperature coefficient associated with the circulating nuclear fuel; that is to say, upon increase in temperature of the fuel contained within the reactor vessel, the densities of both the fuel and the vehicular moderator decrease and likewise the moderating characteristic decreases. By the same token, this decrease in density increases the distance between the fissile atoms of the fuel, thereby in effect increasing slightly the critical mass necessary for a self-sustaining chain reaction. Additional control is accomplished, if required, by diluting the circulating fuel with additional vehicle or solvent, by adding a neutron-absorbing poison such as cadmium, boron, or xenon, or by draining the contents of the reactor vessel into a series of storage tanks presently to be described. The latter arrangement also serves to terminate the chain reaction completely in an emergency or to shut down the reactor for maintenance and the like.

The circulating nuclear fuel, in a "simple burner" type homogeneous reactor, contains primarily one or more of the known fissile isotopes $_{92}U^{233}$, $_{92}U^{235}$, or $_{94}Pu^{239}$. However, in "regenerative" or "breeder" types of reactors an additional quantity of a fertile isotope such as $_{90}Th^{232}$ or $_{92}U^{238}$ is mixed with the circulating fuel material. The latter isotope can be added in the form of natural uranium, which is a mixture of the $U^{238}$ isotope with approximately 0.7% $U^{235}$. In an efficient homogeneous reactor of the latter-mentioned types, it is possible to regenerate from the one or more fertile isotopes at least as much fissile isotope as is consumed in chain reaction.

During the progress of the chain reaction, each fissile atom emits an average of two to three neutrons when fissioned. Approximately one of these neutrons is utilized in propagating the chain reaction. Another one of these neutrons is employed in one of the series of nuclear reactions described below, where a quantity of the fertile material is to be transmuted into fissile isotope equivalent, for example, to the amount of fissile material consumed in the chain reaction. If such is the case, only fertile material need be added to the reactor system during its operation. The remainder of the fission-produced neutrons are absorbed in structural and moderator materials or in non-fissioning capture by atoms of fissile material.

Upon capturing one of the aforesaid neutrons the fertile material $_{92}U^{238}$, if employed, and converted into the transuranic element plutonium ($_{94}Pu^{239}$) in accordance with the following nuclear equations:

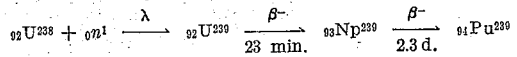

with the times denoted at the latter two reactions being the half-lives of the decaying isotopes. The transuranic element $_{94}Pu^{239}$, one of the aforesaid fissile isotopes, is endowed with a half-life of 24,000 years and thus is relatively stable.

On the other hand, the artificial fissile isotope $_{92}U^{233}$ is obtained when thorium is employed as a fertile material. The $U^{233}$ isotope is formed as a result of the following series of nuclear reactions:

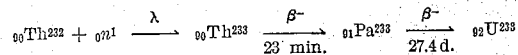

The resultant fissile isotope $U^{233}$, having a half-life of 163,000 years, likewise is relatively stable.

More specifically, the homogeneous reactor system comprises a reactor vessel 20 having a spheriodal configuration and provided at diametrically opposite areas thereof with inlet and outlet manifolds 22 and 24 respectively. The reactor vessel 20 is of sufficient size to contain as aforesaid a critical mass of the circulating nuclear fuel flowing through the vessel and primary loops of the reactor. In this application, wherein a circulating slurry of the oxides of thorium ($ThO_2$) and highly enriched uranium ($UO_2$) is employed as a suspension in a vehicle including deuterium oxide or heavy water ($D_2O$), the inside diameter of the innermost reactor vessel shield 40 is of the order of 13 feet. The aforementioned slurry thus includes a fissionable material in the form of uranium 235 and a fertile material, thorium 232. Additionally, a small proportion of the fertile material, uranium 238, is included unavoidably with the $U^{235}$ isotope.

In this example of the homogeneous reactor system, a total of four circulating loops are connected to the intake and outlet manifolds 22 and 24 by means of inlet and outlet conduits 26 and 28, respectively. The outlet conduit 28 is connected to a gas separator 30 which in turn is coupled in series with a steam generating heat exchanger 32 coupled through a conduit 35 to the suctional side 34 of a primary slurry pump 36. The gas separator 30 is furnished in a conventional design and is arranged to remove fission and radiolytic gases from the system which gases are conducted out of the separator by means of a conduit 31. The steam generator 32 which is provided, inter alia, with a feed water inlet 33 and a steam outlet conduit 37 is fabricated in a form such as that described in the aforesaid copending application of William A. Webb et al., Serial No. 659,002, now abandoned. The discharge side of the pump 36 is coupled to the intake conduit 26 and manifold 22 of the reactor vessel.

In this example, the reactor vessel 20 is formed from a plurality of spheroidal sections 38 which are welded together as shown to form the completed vessel. In order to prevent inducement of thermal stresses within the walls of the vessels 20, which are of the order of six and one-half inches in thickness, a plurality of thermal shields indicated generally by the reference character 40, are disposed adjacent the inner surface of the reactor vessel walls. The thermal shields 40 conform generally to the inner configuration of the vessel walls and are spaced therefrom and from one another in order to provide, in this example, channels therebetween for passage of the circulating nuclear fuel. Inasmuch as the thermal shields 40 are subjected to little or no pressure differentials, they are made relatively thinner with respect to the vessel walls 20. A plurality of baffles 42 are disposed adjacent the lower or intake manifold 22 and are suitably shaped for distributing the incoming slurry as indicated by flow arrows 44 throughout the interior areas of the vessel 20 and for diverting a portion of this flow through the passages formed between the thermal shields 40 and adjacent the inner wall of the vessel. A neutron reflecting member (not shown) can be disposed adjacent the thermal shields to reflect peripheral neutrons back into the central region of the vessel 20 in order to improve the neutron economy of the chain reaction.

The disposition of the thermal shields 40 in this manner substantially prevents impingement of fission-neutrons upon the adjacent vessel walls. Accordingly, the heating effect of the impinging neutrons is developed almost entirely within the thermal shields 40 which are not subject to pressure stresses as are the walls of the pressurized vessel 20. Moreover, the heat developed within the thermal shields 40 is readily removed by that portion of the circulating fuel flowing through the channels therebetween. Alternatively, the thermal shields 40 can be replaced by the shield arrangement disclosed and claimed in a copending application of W. P. Haass, entitled "Reactional Vessel," Serial No. 652,627, filed April 2, 1957, now U.S. Patent No. 3,075,909, issued January 29, 1963, and assigned to the present assignee.

The pressurized reactor vessel 20 is mounted upon an annular supporting collar indicated generally by the reference character 46 and mounted upon the biological shielding wall portion 48. This mounting of the reactor vessel 20 and the distribution of the primary circulating loops associated therewith will be described in greater detail in connection with FIGS. 3 to 9 of the drawings.

In order to drain the reactor vessel, a drain outlet 50 disposed in the lower or intake manifold 22 is coupled to a series of slurry drain tanks 52, through a conduit 54. When it is desired to fill the reactor vessel system, the slurry contained in the drain tanks 52 is returned through another conduit 56 which is coupled to one or more of the loop conduits 35. To aid in filling the reactor vessel and associated loops, an auxiliary slurry pump 58 is coupled into the conduit 56. The disposition of the drain tanks 52 relative to the nuclear power plant layout arrangement is described hereinafter in greater detail. For the present, it may be pointed out that the drain tanks 52 are provided in sufficient number to contain all of the circulating nuclear fuel slurry of the system but are of such size that none of the tanks can contain a critical mass of slurry. Suitable neutron-absorbing material is disposed between adjacent tanks in order to prevent the development of a chain reaction within the collective group of tanks when they are filled with homogeneous type fuel, as described hereinafter in connection with FIG. 3 of the drawings.

In one exemplary arrangement, the fluid fuel contained within each of the drain tanks 52 is stirred constantly by individual agitators 59 mounted adjacent the top of each of the tanks 52. The tanks 52 and the agitators 59 desirably are provided in the form of that disclosed and claimed in a copending application of Mei and Widmer, entitled "Hermetically Sealed Agitator," Serial No. 672,661, filed July 18, 1957, assigned to the present assignee, and now Patent No. 2,907,556.

The upper or outlet header 24 is fitted with an additional port 60 to which a surge tank 62 is coupled by means of a conduit 66. In one form of homogeneous reactor system, the surge tank 62 comprises a relatively large volume which, however, is insufficient to contain a critical mass of the circulating fuel. In its operation, the vapor space 68 is formed in the surge tank, which conveniently contains a vapor of the vehicle employed in suspending the aforementioned fissile and fertile oxides. As a result, during a positive system transient within the homogeneous reactor system, a surge of liquid into the tank 62 compresses the vapor confined within the surge tank space 68 thereby relieving at least partially the pressures developed thereby within the system.

A pressurizing vessel 64, which is coupled to the tank 62 by a conduit 67 connecting the vapor spaces therefor, is provided with a number of heating elements, indicated generally by the reference characters 70, arranged for heating a portion of liquid, desirably the same as the aforementioned liquid vehicle of the system. Thus, the reactor system is maintained at the desired operating pressure, by vaporization and expansion of the aforesaid vehicle portion. The pressurizing vessel 64 is provided with an inlet conduit 72 whereby the vessel is initially charged with the aforesaid vehicle portion and make-up vehicle is added to the pressurizing vessel as required. This make-up vehicle is necessitated by radiolytic decomposition of the vehicle within the system and the incomplete recombination of the component gases of the vehicle.

Alternatively, the pressurizing vessel 64 and the surge tank 62 can be replaced by the pressure regulating system claimed and disclosed in a copending application of Jules Wainrib, entitled "Pressure Regulating System," Serial No. 677,942, filed August 13, 1957, now U.S. Patent No. 3,060,110, issued October 23, 1962, and assigned to the present assignee.

Referring now more particularly to FIG. 2 of the drawings, various auxiliary equipment associated with the aforedescribed homogeneous reactor system, is illustrated schematically therein. In the arrangement of the homogeneous reactor system, illustrated in FIG. 2, the primary slurry pump 36 is furnished with a capacity of approximately 8,000 gallons per minute which in conjunction with the other primary slurry pumps, not shown, but disposed in the other circulating loop systems indicated generally by arrows 74, a total rate of flow of approximately 32,000 gallons per minute is obtained through the reactor vessel 20 and the circulating loops which together enclose a total volume of approximately 20,000 gallons. In this application of the invention, the circulating slurry comprises a vehicle of deuterium oxide ($D_2O$) in which is suspended 251 grams of thorium oxide ($ThO_2$) per kilogram of $D_2O$ and nine grams of uranium ($UO_2$) per kilogram of $D_2O$. The uranium is "fully enriched" and contains upwards of 90% of $U^{235}$ isotope. The nine grams of uranium include a small proportion of palladium catalyst employed to promote internal recombination of some of the radiolytic vehicle gases, deuterium and oxygen.

Accordingly, the system circulates a mixed oxide slurry with a total oxide concentration of about 260 grams per kilogram of $D_2O$ which corresponds to a solids content of about 3% by volume. The reactor vessel 20 and the circulating loops 74 are maintained under a pressure in the neighborhood of 2,000 pounds per square inch absolute by operation of the pressurizing vessel 64. The pressurizing vessel 64, which contains only deuterium oxide or other vehicle employed in the homogeneous system as noted heretofore, is separated from the liquid or slurry portion of the surge tank 62 by means of the steam space 68 thereof, to which the conduit 67 is coupled, thus avoiding the caking that might result if the circulating slurry itself were boiled in the pressurizing vessel 64.

Leaving the reactor vessel the slurry branches into four parallel identical circulating loops 74 only one of which is illustrated in detail. Each loop can be isolated from the reactor by two pairs of dual stop valves 76 to permit certain types of remote or semi-direct maintenance to be performed on one of the circulating loops without shutting down the entire plant, for example, in the manner described in the copending application of McGrath et al., Serial No. 659,003, entitled Semidirect Equipment Maintenance, filed May 14, 1957, and assigned to the instant assignee, and in the aforesaid abandoned application of Webb et al., Serial No. 659,002.

Within the reactor vessel, part of the kinetic energy of the fission fragments is absorbed by the deuterium oxide molecules which is disassociated into deuterium and oxygen. However, the major portion of these radiolytic gases is recombined by means of an external recombination unit indicated generally by the reference character 78, wherein the gases are recombined through the use of a suitable external catalytic agent, such as platinum. The unit 78 is coupled to the outlet through a conduit 79 to a gas letdown or depressurizing device 80, which in turn is connected to the conduits 31 of the gas separator 30. In this arrangement, the depressurizing device is adapted for handling approximately 9,000 pounds per hour of gases and entrainment extracted from the primary loops by the gas separators 30. The slurry entrainment of the gas separator output is separated at the depressurizing device and is returned directly to the suctional side of the primary slurry pump 36 by means of a conduit 82. The pure deuterium oxide formed from the radiolytic gaseous components thereof at the recombination unit is conducted from the unit through outlet 84 and suitable conduits to the primary slurry pumps 36, the auxiliary pump 58 and valves 76 for purging purposes. The total deuterium oxide output of the recombination unit, some of which is used for purging in this example, is in the neighborhood of 1,000 pounds per hour. The remainder of this output is added to the pressurizing vessel 64 by means of its feed water inlet 72. The pressurizing vessel feed water or make-up vehicle is in the order of 100 pounds per hour of deuterium oxide.

The uncondensed gases issuing from the recombination unit 78 through a conduit 88 are delivered to an off-gas system 90 whereat a suitable quantity of ventilation air, taken from the reactor plant arrangement presently to be described, is mixed with the radioactive uncondensed gases in order to dilute these gases, for example, radioisotopes of krypton and xenon, before venting the same to the surrounding atmosphere. Before venting, these gases are held up in charcoal beds (not shown) until their radioactivity has decayed to a minimum value. Any deuterium oxide which is recovered in the off-gas system 90 is returned through a conduit 92 to the recombination unit 78 where it is combined with the deuterium oxide output thereof.

A very small and not necessarily constant stream of the order averaging 18 pounds per hour is bled from one of the primary circulating loops 74 and is conducted through a conduit 94 to a slurry-letdown or depressurizing arrangement 96. In the slurry-letdown system 96, a substantial amount of system pressure is removed from the slurry and at the same time it is cooled to prevent flashing. The slurry is then concentrated by evaporation or settling, and the vehicle or diluted slurry is returned to the suctional side of the primary slurry pump 36 by means of a conduit 98. The conduit 98 desirably joins the outlet conduit 56 of the slurry draining and filling system, indicated schematically at 100, and thus is returned to the primary circulating loop by means of the auxiliary slurry pump 58. For purposes of initially filling the reactor system, the auxiliary slurry pump and conduit 56 is by-passed by a conduit 102 connecting the drain tanks 52 (FIG. 1) of the slurry handling system 100 directly to the suctional side of the primary pump 36 whereby in this example the latter pump can draw the homogeneous reactor fuel directly from the drain tanks 52.

The concentrated slurry output of the slurry letdown system 96 which is now maintained at a lower pressure suitable for chemical processing is conducted through a conduit 104 to a chemical processing plant 106 which is arranged exteriorly of the nuclear power plant, but nevertheless, is integrated therewith. In the chemical processing plant, the fission products are removed and the reprocessed slurry is returned to one of the primary circulating loops through an outlet conduit 108, the conduits 98 and 56, and the auxiliary slurry pump 58. The liquid and solid wastes separated from the concentrated slurry are conducted to suitable storage chambers to await sufficient decay thereof in the case of short-lived radioactive materials or for underground burial in the case of long-lived materials through a conduit 110. Additional fertile material is added to the reactor system through conduit 111 (FIG. 2), whereby the material desirably is mixed with the reprocessed slurry. Another conduit 112 is provided for conducting radioactive gaseous materials separated in the chemical processing plant to the off-gas system 90.

In the operation of the homogeneous reactor system, approximately 18,000,000 pounds per hour of the circulating nuclear fuel suspension or slurry enters the reactor vessel 20 at a temperature of approximately 465° F. As the chain reaction proceeds within the reactor vessel 20, with the deuterium oxide vehicle of the slurry, acting as a moderator therefor, the temperature of the circulating fuel issuing from the top or outlet manifold 24 of the vessel is increased to 580° F., at maximum power output. With the arrangement shown, approximately 550 megawatts of heat is developed by the reactor system of which 150 megawatts or 27.5 percent is converted to electrical energy by a suitable thermodynamic arrangement (not shown). As explained heretofore, the circulating fuel is divided into four streams which are conducted respectively to the four steam generators 32 where the heat developed in the reactor vessel is given up to ordinary water maintained in the steam side of the generator to form a total of approximately two million pounds per hour of steam at a pressure in the neighborhood of 400 pounds per square inch absolute. This output from the four steam generators is conducted, for an example, to a turbine (not shown) through the steam outlet conduits 37 from which turbine the spent steam or condensate is returned through the feed water inlets 33 to the individual steam generators.

Figure 4:
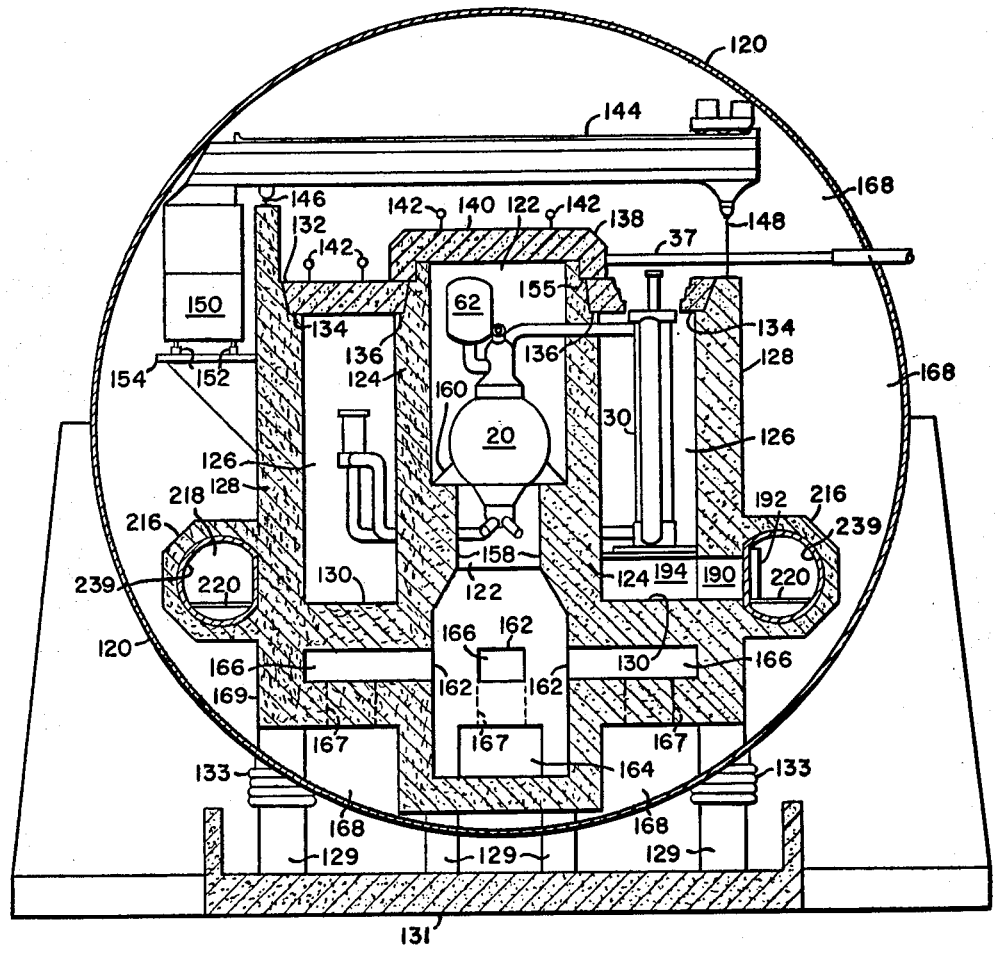
FIG. 4 is a cross-sectional view of the plant arrangement illustrated in FIG. 3 and taken along reference lines IV—IV thereof.
Figure 5:
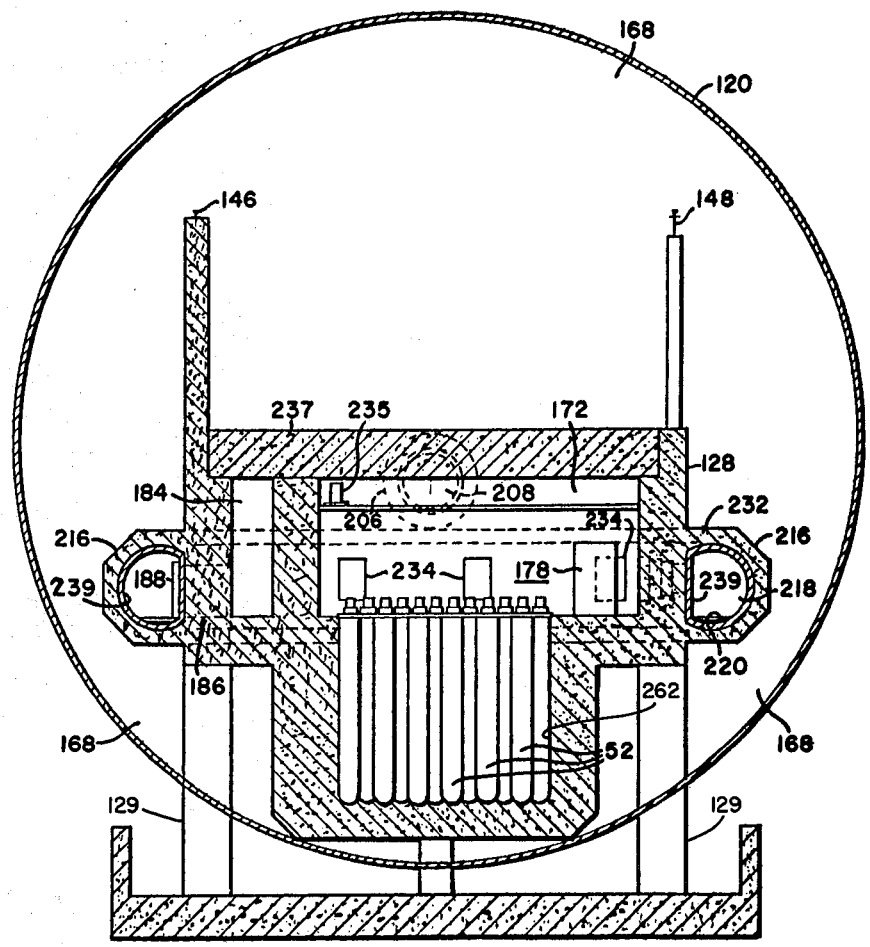
FIG. 5 is another cross-sectional view of the plant arrangement shown in FIG. 3 but taken along reference lines V—V.

Referring now more particularly to FIGS. 3 to 5 of the drawings, an exemplary plant arrangement of the aforedescribed reactor system, or other nuclear reactor system, is illustrated therein. In this arrangement of the invention, the reactor vessel 20 together with the primary circulating loops 74 and the aforementioned auxiliary equipment are arranged into a plurality of shielded cells or compartments which are enclosed within a vapor container 120 which is provided with a wall thickness of sufficient strength to contain, in the event of an accident, all of the volatile components of the aforedescribed homogeneous reactor system, should these components become vaporized. In this arrangement of the invention the vapor container 120 is fabricated with an overall length of 210 feet between tangents and with the outside diameter of 125 feet and with a wall thickness of about one inch. Accordingly, the vapor container in this example is arranged to contain a maximum pressure of approximately two atmospheres absolute.

The reactor vessel 20 is mounted within a cylindrical cell or enclosure 122, the walls 124 of which are fabricated from a suitable biological shielding material, which in conjunction with the primary circulating loop shielding walls presently to be described has sufficient thickness to afford adequate shielding, in conjunction with outer shielding wall 128, of the reactor during operation thereof for personnel standing outside of the primary coolant loop cells. Accordingly, the cylindrical walls 124 of the reactor enclosure 122 in this example are approximately five feet in thickness and are formed from ordinary concrete. Each of the primary coolant loops 74 is disposed in an individual cell or compartment 126 all of which are surrounded by the outer shielding wall 128 and are compartmentized by shielding partition walls 130. Thus, each loop 74 is disposed in a separate, shielded cell.

The outer shielding walls and other components of the reactor plant shielding and structural arrangement are supported by a plurality of concrete columns 129 (FIGS. 4 and 5) which are extended through the underside of the vapor container 120 and are mounted upon a suitable foundation indicated generally by the reference character 131. The vapor container is secured to the columns by means of expansion joints 133 to permit differential thermal expansion. The outer shielding wall 128 in this example of the invention, is approximately seven feet in thickness and, like the cylindrical walls 124 of the reactor vessel cell are fabricated from ordinary concrete as are the partition walls 130.

Each of the primary circulating cells 126 is provided with a top cover or plug member 132 through which the steam outlet conduits 37 individually extend (FIG. 4). Each of the covers 132 are seated into an offset portion formed adjacent the top of each of the shielding walls 128 and 130, as indicated by the reference characters 134 (FIG. 4). Additional offset portions 136 are provided on the external surfaces of the cylindrical wall 124 of the vessel compartment in which the aforesaid covers 132 also are fitted. The upper extremity of the cylindrical walls 124 are provided with an annular shoulder 155 formed on the exterior surface of the walls 124 and upwardly of the offset 136. Upon the shoulder 155, a cover member 140 of the vessel compartment 122 is partially fitted. The remainder of the weight of the member 140 is borne by the adjacent covers 132 of the primary loop compartments. To increase their weight, the covers 132 and the cover member 140 are made from high density concrete in the order of 4½ feet in thickness and densified with barytes or magnetite. Each of the covers 132 and cover member 140 are provided with lifting eye hooks 142 for raising and lowering the covers and cover member by means of a suitable crane 144 (FIG. 4). The cover member 140 is bolted down (not shown) to prevent removal in the event of explosion.

The crane 144 is arranged for movement along tracks 146 and 148 which are supported on the top surfaces of the outer reactor plant shielding walls 128. The crane 144 is remotely operated from a shielded cab, indicated generally by the reference character 150 and movable with the crane 144. Thus, the shielded cab 150 is supported upon another pair of tracks 152 which are mounted atop a platform 154 (FIG. 4) which in turn is secured to the exterior surface of the outer shielding wall 128.

The reactor vessel 20 is supported on a thickened wall portion 158 (FIG. 4) formed at the lower portion of the cylindrical walls 124 of the reactor vessel cell. In furtherance of this purpose, an annular collar 160 is seated upon the upper end of the thickened portions 158 and engages the undersurface of the spheroidal part of the vessel 20. Adjacent the bottom of the reactor vessel cell 122, the walls 124 thereof are provided with a plurality of flow-out passages or openings 162 and 164 through which openings the reactor vessel cell 122 communicates by way of suitable longitudinal passages 166 and connecting vertical passages 167, disposed in the concrete floor 169 of the collant loop cells 126, with the interior 168 of the vapor container 120.

As better shown in FIG. 3 of the drawings, the nuclear reactor auxiliary equipment are arranged in similar shielded cells enclosed by the outer shielding wall 128 but are physically removed from the reactor and circulating loop compartments 122 and 126, from which these components are shielded by a relatively thick shielding wall 170 interposed therebetween. Accordingly, in the cell or compartment 172, the drain tanks 52 are enclosed and are mutually shielded one from another by means of neutron absorbing material 174 composed of a one foot thickness of ordinary concrete and inserted between adjacent tanks 52. Thus, the drain tanks 52 can be relatively closely spaced without engendering a chain reaction of the fissile material contained therewithin. In the latter mentioned compartment 172, there is disposed also a condenser and a circulating arrangement for each of the drain tanks indicated generally by the reference character 176. Adjacent the drain tanks 52 and in the same compartment 172 are arranged the recombination and offgas units described heretofore and indicated here by the reference character 178.

In a separate, shielded cell 180, there is disposed the letdown device 80 described heretofore and entrainment separator 181 which are shielded from the drain tank compartment 172 by a concrete partition 182. Also adjacent the drain tank compartment 172 is another shielded cell 184 containing deuterium oxide storage and pressurizing means for the pump and valve purging water noted heretofore. Since the deuterium oxide storage cell 184 has a relatively low level of associated radioactivity, the cell 184 can be entered during plant shut down, for a limited time, through an access passage 186 extending through the adjacent outer shielding wall 128. The passageway 186 is closed off, sealed, and shielded when not used by a sliding door 188 fabricated desirably from lead or other appropriately dense material and furnished with a thickness, in this example, of the order of 7 inches.

The passageway 186 of the cell 184 can be reached when the reactor plant is in operation by suitable personnel access means associated with the plant arrangement and described hereinafter. Similar passageways 190 are formed in the outer shielding wall 128 and disposed individually adjacent the steam generators 32. The passageways 190 are closed in this example by sliding and sealable lead doors 192 which are fabricated in the same manner as that described in connection with the compartment door 188. These latter-mentioned passages 190 are each arranged to permit entry into a permanently installed steam generator maintenance booth 194 which is arranged to provide personnel shielding for limited times relative to the reactor vessel 20 and the equipment of the circulating loop 74. As better shown in FIG. 3, the shielded booth 194 is arranged adjacent the lower end of the U-tube type heat exchanger 32. The top of the maintenance booth 194 is at least partially shielded by a lead plate 196 having a thickness of the order of 7 or 8 inches. With this latter arrangement, personnel can enter one of the compartments 194 while the reactor plant is in operation after having isolated the corresponding circulating loop 74 by operation of the stop valves 76 (FIG. 2), if the booth 194 is sealed against entry of the container atmosphere. With suitable tools and equipment, maintenance personnel can then remove, as required, the adjacent portions of the steam generator whereby access can be had to the U-tubes disposed at the lower end thereof. Alternatively, the shielded booth 194 can be replaced by the remote maintenance arrangements described and claimed in the aforementioned abandoned application of William A. Webb et al., Serial No. 659,002.

Adjacent one end of the shielded outer wall 128 of the aforedescribed reactor plant, an air-lock arrangement 206 (FIG. 3) is disposed whereby equipment can be moved into or out of the vapor container 120 without the escape of the hazardous atmosphere normally present within the vapor container 120 during the nuclear plant operation. In this example of the invention, the air-lock 206 comprises a receiving area 208 adjacent the inward end of the air-lock and having a top opening whereby various items of the equipment can be placed within the area 208 by operation of the crane 144. Upon opening a first sealed door 210, the items contained within the area 208 are then moved into the area 212 which is enclosed between the sealed door 210 and a sealed outer door 214. As a result, upon closing the first sealed door 210, and opening the outer sealed door, these items can be withdrawn from the air-lock 206 and vapor container 120. Suitable air conditioning means and equipment decontaminating means can be coupled to the area 212 enclosed between the sealed doors for the purpose of changing the atmosphere contained therein and for decontaminating the equipment before it is moved outside of the air-lock 206. In this example of the invention, the air-lock 206 is supported by the adjacent wall of the container 120 and by the outer shielding wall 128 of the nuclear plant.

One form of the aforementioned personnel access means is illustrated in FIGS. 3 to 5 of the drawings. As noted heretofore, this personnel access means is arranged in this example to provide access for limited periods of time to the steam generator maintenance cells 194 which are sealed as aforesaid or alternately the doors 192 thereof are sealed, and to other areas within the nuclear plant, which are not dangerously radioactive, for example, the deuterium oxide storage cells 184. The personnel access means are disposed desirably insofar as possible at the external surface of the outer biological shielding wall 128 which surrounds the nuclear reactor and associated equipment. These access means are provided with additional means for connecting them through suitable openings in the vapor container 120 such that the personnel access means can be sealed from the dangerously radioactive atmosphere formed within the vapor container 120.

In this example of the invention, the aforesaid personnel access means is provided in the form of a shielded tubular conduit 216 secured to the outer surface of the outer shielding wall 128 but disposed within the vapor container 120. The personnel conduit 216 which encompasses the major portion of the outer shielding wall 128 is provided with an inner passage 218 of a size sufficient for maintenance personnel to walk comfortably. In furtherance of this purpose, the interior of the tubular member 216 is provided with a catwalk type floor 220.

The shielded tubular member 216 extends a sufficient distance around the outer shielding wall 128 and is secured thereto at a height such that the interior corridor 218 thereof communicates with the passageways 186 and 190 of the reactor plant cell 184 and of the accessible maintenance cells 194 disposed beneath each of the steam generators 32.

The remaining steam generator 32' and its maintenance cell 194' are reached by another access corridor 222 which extends into the reactor plant itself. That is to say, the latter corridor extends interiorly of the outer shielding wall 128 but is shielded from the highly radioactive primary loop arrangement and the reactor vessel 20 by means of the shielding wall 170 separating the reactor compartments from the auxiliary equipment cells and, of course, by the reactor shielding wall 124. Similarly, the access corridor 222 is biologically shielded from the remainder of the auxiliary compartments 182, 172 and 184 by a shielding partition 224 of a thickness approximately equal to that of the dividing wall 170 and likewise fabricated from ordinary concrete. Thus, the access corridor 222 can be entered by maintenance personnel during operation of the plant, provided it is sealed, in order to reach the steam generator maintenance cell 194' after having isolated the associated primary loop 74' from the remainder of the system. The access corridor 222 can be entered from the shielded tubular member 216 through the passageway 190' and shielding door 192'.

The corridor 222 serves the additional function of permitting visual access to adjacent portions of the slurry drain tank cell 172 through the use of a periscope 226 or the like. Additionally, various operating means indicated by the reference character 228 mounted within the access corridor 222 desirably are provided for operating various valves and the like associated with equipment contained within the compartment 172, either manually or by suitable servo mechanisms.

In addition, various recording means and the like can be mounted within the access corridor 222 or within the interior passage 218 of the shielded conduit 216 for recording either directly or indirectly the variables associated with the operation of the nuclear plant. Accordingly, it is not necessary in many cases to extend a great number of instrumentational leads through the walls of the vapor container 120. Not only is the expense of providing instrumentation for the nuclear plant reduced, but in addition, the development of hazardous leaks in and around the aforesaid leads, if passed through the vapor container walls, is obviated. Moreover, the access corridors 222 and 218 additionally can be employed for the conduction of various piping and electrical wiring, such as the purging water conduits indicated generally at 230, between various areas of the nuclear plant. As a result, these conduits, electrical connections and instrumentational leads frequently can be serviced without involving costly shutting down of the nuclear plant.

The personnel access corridors 218 are shielded from the radioactive atmosphere within the vapor container 120 and other radiations associated with the nuclear plant by means of the shielding walls 232 forming the tubular member 216. In this example of the invention, in order to ensure adequate personnel protection against these attendant radiations, the walls 232 of the access corridor 218 are fabricated from concrete having a minimum thickness in the order of two feet. Thinner access corridor walls 232 can be utilized if desired by forming the walls from a much denser material such as lead or by adding a densifying material to the concrete, for an example, barytes or magnetite.

In accordance with one application of the invention, direct visual access to selected ones of the aforementioned reactor plant compartments is afforded by suitably disposed windows 234 extending through the outer shielding wall 128 of the reactor plant and opening into the access corridors 218 or 222. Although it is contemplated that all of the aforementioned reactor plant compartments or cells with the exception of the reactor vessel cell 122, can be so provided with windows, the same in this example have been provided only for the drain tank compartment 172 and for the letdown and entrainment separator cell 180, for the reasons that this equipment technically is more complicated, but has a lower degree of radioactivity associated therewith. The windows 234 are formed of a thick glass member having a thickness between $2/3$ and $3/4$ of that of the outer shielding wall 128. The difference of thickness between the concrete wall 128 and the glass window 234, of course, is equivalent to the differing densities thereof and resultant radiation shielding ability. Each of the glass members 234 and the associated openings into which they are inserted are provided with complementary offset surfaces 236 in order to prevent radiation streaming through the junction between the glass and the adjacent portions of the shielding wall.

In this example of the invention, the reactor plant compartment 184 between the deuterium oxide storage tanks and related equipment is not provided with a window in this manner inasmuch as limited access thereto can be had with the passage 186 and the door 188. A series of valve handles 238 are provided adjacent some of the glass shielding windows 234 for operating the large number of valves associated with the drain tanks 52 and with the condenser and circulating equipment thereof. A remotely operated mechanical arm 235 is mounted within the cell 172, which arm is operable from within the adjacent access corridor 218. Thus, remote maintenance of equipment within the cell 172 can be effected without entering the same or without removing its shield top cover 237.

In order to prevent the atmosphere within the personnel access corridors 222 and 218 from becoming radioactive, these corridors are sealed insofar as possible from the remaining areas within the vapor container 120. In furtherance of this purpose, the corridors are lined with a sealed steel shell 239, and a suitable blower arrangement 240 is coupled adjacent one end of the personnel corridor 218 by means of a conduit 242 extending through the vapor containing wall and into the corridor 218. An outlet for the air forced into the access corridors in this fashion is provided adjacent the other end thereof by a second conduit 244 likewise extending through the wall of the vapor container 120 in communicating with the access corridor 218. With this arrangement, a clean supply of air is furnished to the access corridors during a time when personnel have entered the same.

To allow for differences in thermal expansion between the concrete shielding and the metallic walls of the vapor container 120, a suitable expansion joint 254 is coupled between the entrance portions 246 and 248 of the access corridors, and is sealed to the adjacent ends of the steel shell extensions 247 and 249 lining these entrance portions, respectively. The entrance portions 246 are joined to the adjacent wall portions of the vapor container 120 where the entrance portions 246 are closed by shielded doors 250 and 252, respectively. Relative movement between the entrance portions 246 and 248 is afforded by means of the expansion joints 254 coupled between each pair of the entrance portions 246 and 248. The expansion joints 254 are shielded biologically by a pair of annular shielding members 256 individually surrounding the expansion joints and engaging the wall portions of the entrance portions 246 and 248 on each side of the associated expansion joint 254 respectively. The entrance portions are sealed from the container atmosphere by sealing the expansion joints 254 to the adjacent liners 247 and 249. The entrances 246 and 248 of the access corridors can be reached from the floor level of the reactor plant by means of stairways 258 arranged exteriorly of the vapor container 120.

Figure 6:
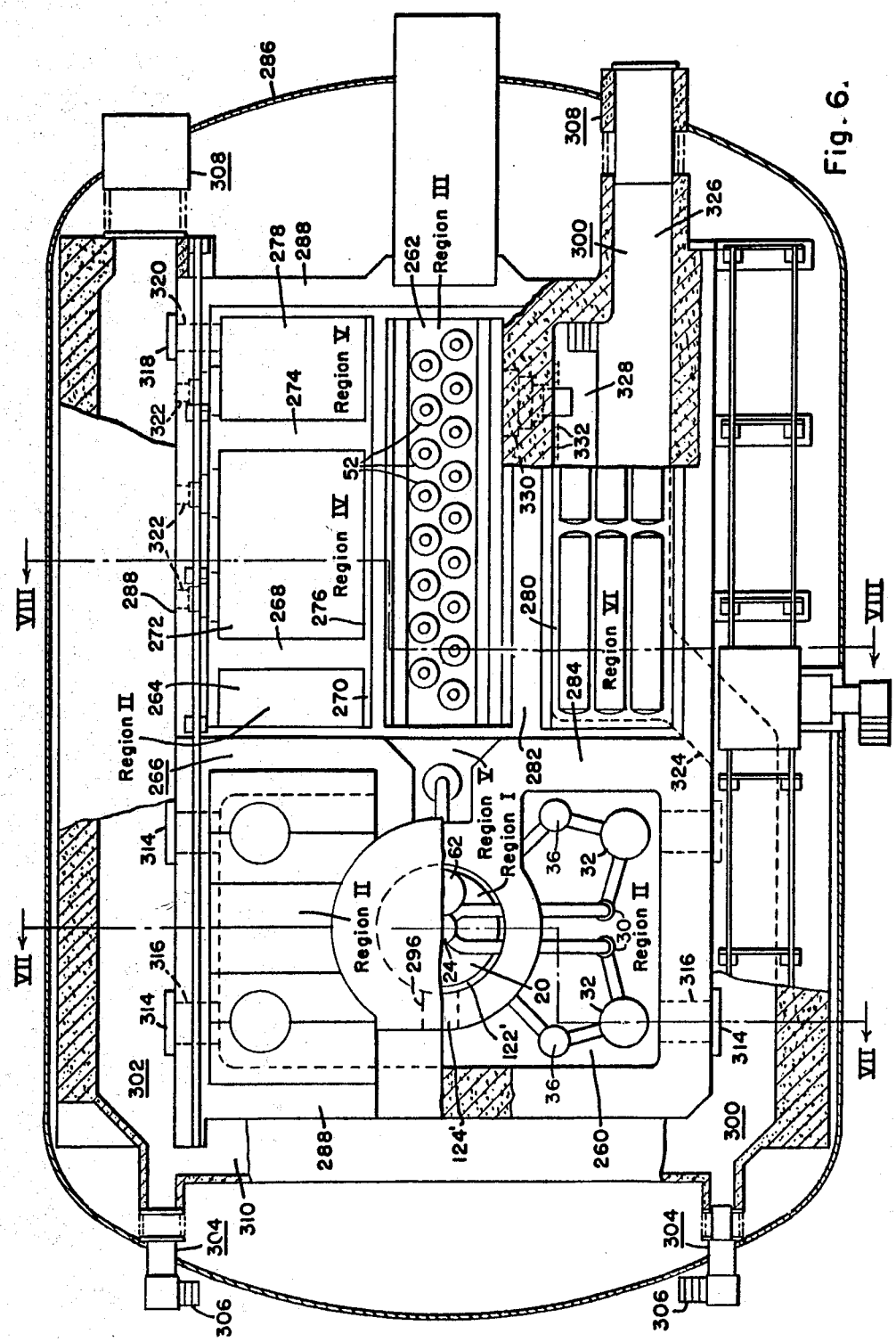
FIG. 6 is a top plan view, partially in section, of another radioactive plant arrangement, pursuant to the invention.
Figure 7:
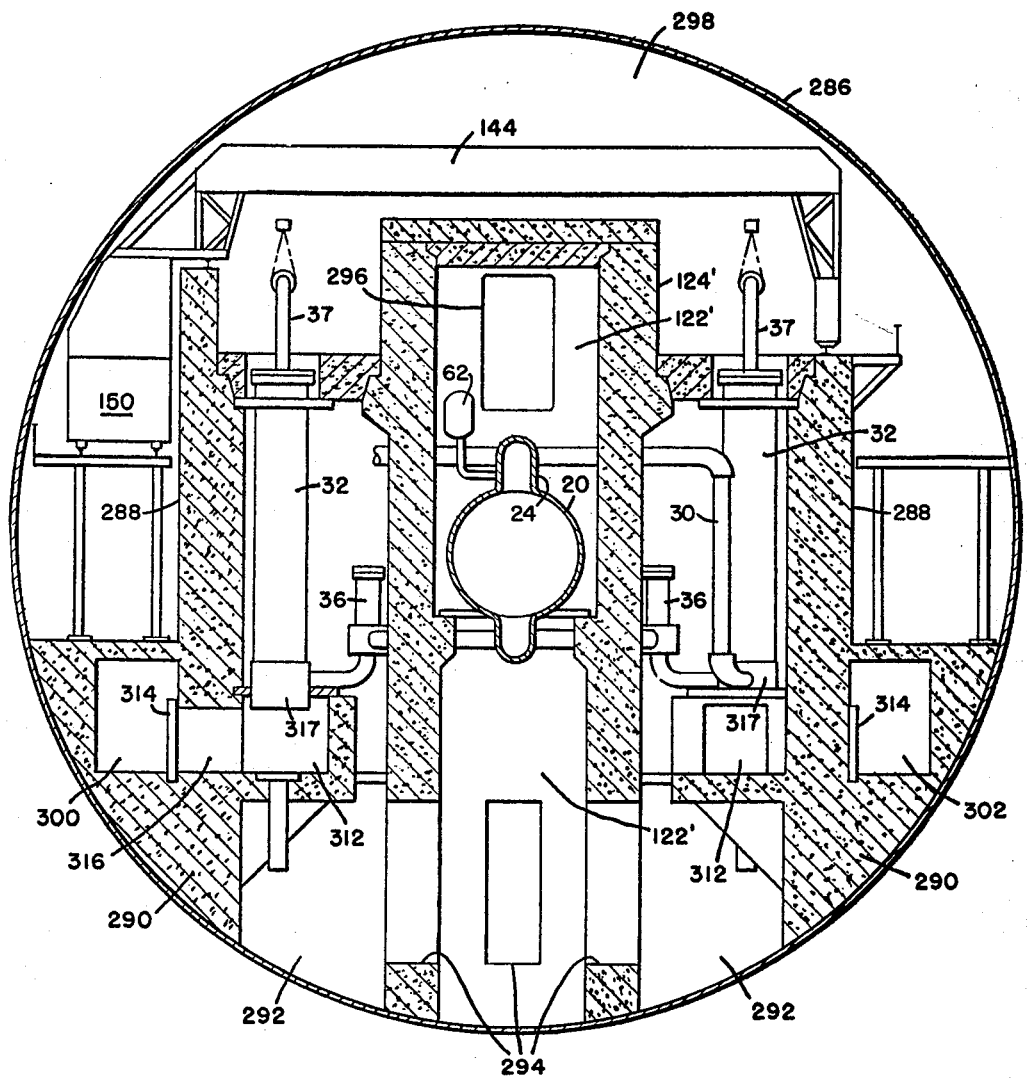
FIG. 7 is a cross-sectional view of the plant arrangement illustrated in FIG. 6 and taken along reference lines VII—VII thereof.
Figure 8:
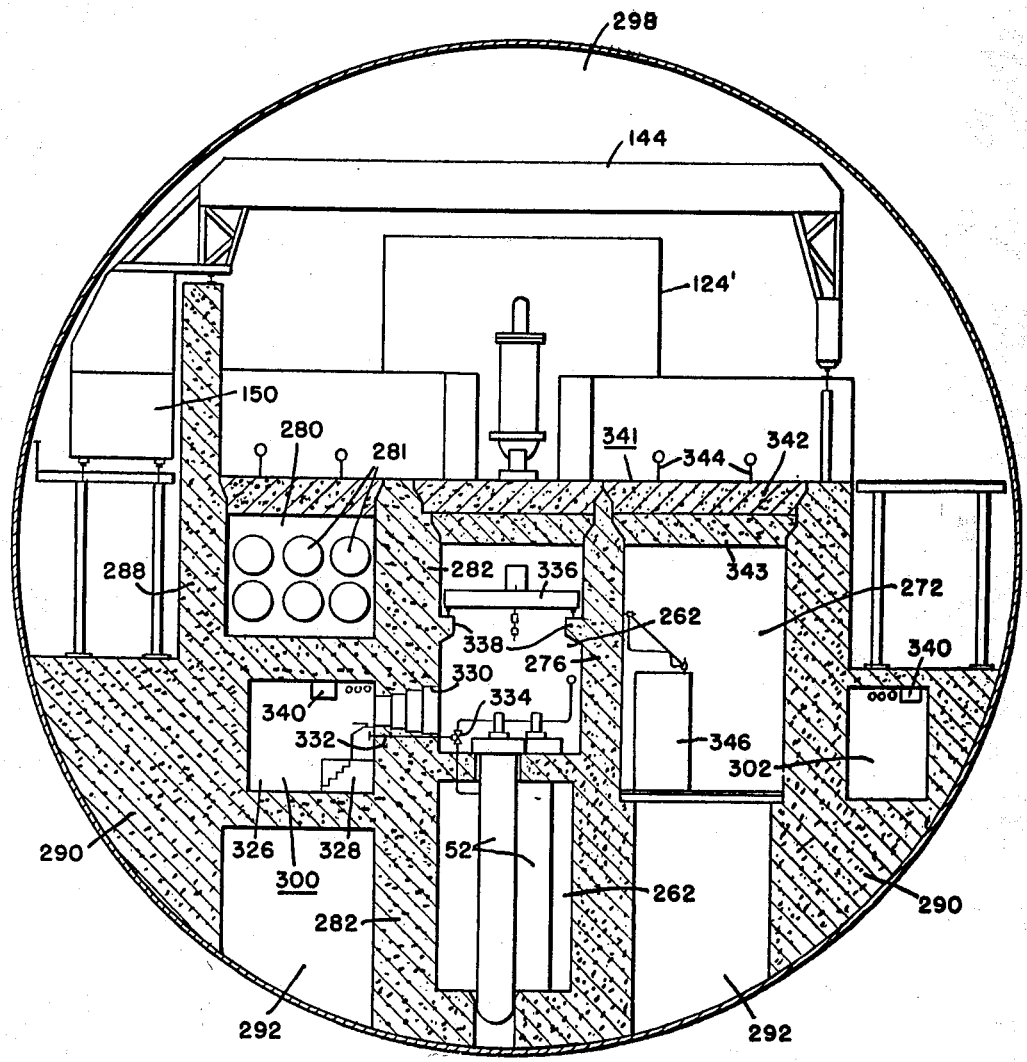
FIG. 8 is another cross-sectional view of the plant arrangement of FIG. 6 but taken along reference lines VIII—VIII.

In FIGS. 6 to 8 of the drawings, another reactor plant arrangement is illustrated, which arrangement likewise is adapted particularly for use in conjunction with the homogeneous reactor system described heretofore. In the latter arrangement of the invention, the aforedescribed personnel access passages together with the equipment associated with the reactor are grouped in accordance with the type and level of radioactivity associated with the various equipment and material handled thereby. In this example of the invention, the reactor vessel 20, shown here with a slightly differing primary circulating loop arrangement, and the surge tank 62 are mounted within the generally cylindrical compartment 122', forming region I of the plant, which compartment is enclosed and shielded from the remainder of the reactor plant by the concrete wall 124'. As indicated heretofore, the surge tank 62 is coupled directly to the outlet manifold 24 of the reactor vessel and accordingly, a high level of neutron and gamma radiation is associated with both of these items.

Region II of the reactor plant, which region includes the primary circulating loop compartment 260, substantially surrounds the reactor vessel compartment 122' or region I of the reactor plant. As indicated heretofore, within region II of the reactor, are disposed the circulating pumps 36, the steam generators 32, and the gas separators 30 as well as the primary loop piping and valves. The radiation associated with this region of the reactor plant during its operation is characterized by intermediate levels of neutronic and gamma emanations. These emanations are a result of residual neutronic radiation within the circulating fuel passing through the loops and of neutrons escaping from the reactor vessel 20. The gamma radiation is emitted from fission products carried along with the circulating fuel and by neutronic irradiation of adjacent structural materials of the circulating loop system.

The drain tanks 52 and associated controlling devices are enclosed, in this example, within a shielded compartment 262 comprising region III of the reactor plant. As stated heretofore, the drain tanks 52 are mutually shielded from one another by the aforementioned neutron absorbing material. Accordingly, region III of the plant is characterized by a low level of neutronic and high level gamma radiations, due to the fact that the fluid nuclear fuel contained therein is not continually being circulated through the reactor vessel 20. In addition, compartment 262 contains auxiliary and associated equipment employed in connection with the drain tanks 52.

Insofar as level and type of radioactivity is concerned, an additional compartment 264 also is included within region II of the reactor plant. In this compartment of the plant, is disposed the highly radioactive equipment associated with the chemical processing plant described heretofore. This equipment includes the slurry letdown device and concentrator 96 described in connection with FIGS. 1 and 2 of the drawings. Inasmuch as a small proportion of the fluid fuel circulating through the primary loops diverted to this equipment during operation of the plant, the type and level of radioactivity associated with the compartment 264 will be the same as that of compartment 260 or the primary loop cell. However, for maintenance purposes compartment 264 is completely shielded from the remainder of the plant compartments by means of concrete shielding walls 266, 268, and 270. This follows from the fact that the chemical reprocessing plant can be shut down for a brief period while the reactor system continues to operate without seriously impairing the efficiency of the latter. Thus, after shutting down the chemical plant, the top cover of compartment 264 can be removed for entry by means of the crane 144.

In region IV of the reactor plant, equipment is mounted having attendant radioactivity resulting from high gamma concentrations but little or no neutronic radiation. As is well known, a given amount of neutronic radiation can cause 5 to 10 times, depending upon the speed of the neutrons, as much biological damage as an equivalent amount of gamma radiation. Moreover, differing shielding measures are required for each of these hazardous radiations. It is well established that in the case of gamma radiation, the effectiveness of shielding material depends entirely upon its density and thickness. On the other hand, in the case of neutronic radiation, a comparatively thin layer of isotopes having high neutronic capture cross section provides adequate personnel shielding at least in the case of thermal neutrons usually associated with the aforedescribed reactor systems. Therefore, due to the differences in shielding and in biological effects of neutronic gamma radiations, that equipment containing only the latter type radioactivity desirably is segregated insofar as possible from the remainder of the plant.

Accordingly, in region IV of the reactor plant, including the compartment 272, is arranged the aforedescribed recombination and separation system. This system is presently to be described in greater detail but, as indicated in FIGS. 1 and 2 of the drawings, is adapted for processing and separating the various gaseous fission product and radiolytic gases from entrained slurry. Due to the comparatively small amount of slurry present within this equipment, there is usually no neutronic radiation associated therewith. However, as indicated heretofore, this equipment handles the relatively long lived, gamma emitting gaseous fission products krypton and xenon. Accordingly, compartment 272 is shielded from the balance of the plant by concrete walls 274 and 276.

That portion of the reactor equipment having a relatively low gamma radiation is disposed in region V of the reactor plant including compartment 278. In this example of the invention, in compartment 278, are arranged the high pressure deuterium oxide storage tanks, the condensate storage tank, and high pressure deuterium oxide pumps. The storage tanks and related equipment are adapted for retaining deuterium oxide under system pressure or slightly above, that is to say, about 2,200 pounds per square inch, for use in pump and valve purging and the like.

The compartment 280 comprising the relatively cold and safe region VI of the plant contains a series of low pressure deuterium oxide storage tanks 281 with twelve being employed in this example of the invention. These tanks are employed as storage receptacles for the recombined deuterium oxide noted heretofore. The deuterium oxide contained in the latter-mentioned storage tanks is piped either to compartment 278 for pressurizing or is employed directly in low pressure applications associated with the plant. Although the compartment 280 can be entered freely during plant operation, the compartment 280 is segregated from the remainder of the plant by means of the concrete partitions 282 and 284, against accidentally filling the tanks 281 with slurry or other radioactive material.

Region VII (not shown) of the reactor plant is located outside of the vapor container 286. In this region are disposed various auxiliary equipment having little or no attendant radioactivity. Such equipment includes helium and nitrogen storage tanks, refrigeration unit, cooling system and the like.

The aforementioned compartments of the reactor plant contained within the vapor container 286 are surrounded by an outer biological shielding wall 288. The lower portion of the outer shielding wall 288, as better shown in FIGS. 7 and 8 of the drawings, seats upon a mass of concrete 290 engaging the inner surface of the vapor container 286 substantially along its length. Also extending along the length of the vapor container are a pair of relatively large passages 292 which communicate with the reactor compartment 122' by means of openings 294 disposed adjacent the lower end of the reactor cell walls 124'. Accordingly, in the event of accident, additional space for expansion of gases contained within the reactor chamber 122' is provided. An additional opening 296 is provided adjacent the upward end of the reactor compartment walls 124' through which the compartment communicates with the remainder of the vacant space 298 contained within the vapor container 286. The reactor cell opening 296 is shielded from the exterior of the plant by an outer wall projection 299 spaced from the opening 296.

Disposed in each of the concrete masses 290 are a pair of personnel access corridors 300 and 302 respectively. In this example of the invention, the access passages 300 and 302 are each entered by the entrance and expansion joint arrangement indicated generally by the reference character 304 and extending through an end wall of the vapor container 286. The entrances are secured to the vapor container wall and are reached by flights of stairs 306. Additional entrances and expansion joints 308 are secured to and extend through the opposite end of the vapor container 286. These latter entrances are made larger for moving various items of equipment therethrough. A connecting access corridor 310 is provided in the form of a generally tubular conduit secured to the outer surface of the outer shielding wall 288 and communicating with the access corridors 300 and 302 adjacent the first-mentioned entrances 304. All of these corridors desirably are sealed through the use of steel shells or the like (not shown) similar to the shells 239 illustrated in FIGS. 3–5. These last-mentioned shells, as well as the linings 239, desirably are fabricated so as to withstand the same pressure as that which can be contained by the vapor container 120. Accordingly in the event of accident personnel within the sealed access corridors are fully protected against the expanding gases. For this purpose, the shells or linings are furnished in a thickness of about one-half inch.

By means of the access corridors 300 and 302, any one of the steam generator maintenance cells 312 (FIG. 7) can be entered, if these cells are sealed for example with the steel lining or shell noted heretofore, during operation of the plant after isolating one of the primary loops from the system by closure of the associated valves 26 (FIG. 2). For this purpose, passages 316 and lead shielding doors 314 are arranged in communication with the steam generator maintenance cells 312, respectively. The passages 316 extend through the outer biological shielding wall 288 at positions individually adjacent the lower ends 317 of the steam generators 32. As indicated heretofore, the direct maintenance cells 312 can be replaced by the remote maintenance arrangement disclosed and claimed in the aforesaid abandoned application of Webb et al., S.N. 659,002.

An additional sealed door 318 and passageway 320 is accessible by means of the corridor 302 and communicates with the region V compartment 278 (FIG. 6) in order to provide limited maintenance access to equipment mounted therewithin. Visual access is afforded to the compartment 278 and to the compartment 272 by means of glass shielding windows 322.

As better shown in FIGS. 6 and 8 of the drawings, the access corridor 300, which is disposed at a lower level within the reactor plant than the region VI compartment 280, is coupled to an inwardly extending corridor section 324 and thus communicates with an enlarged chamber 326 underlying the compartment 280 or low pressure deuterium oxide storage cell. The chamber 326 is provided with an operating platform 328 from which maintenance personnel or operating personnel can observe the equipment mounted within the compartment 262 through a glass shielding window 330. Adjacent the window 330, a plurality of valve extensions 332 extend through the concrete partition 282 for operation either manually or by suitable servo-mechanisms from within the chamber 326. The valves 334, which are controlled by the extensions 332, are coupled in the fluid circuitry associated with the drain tanks 52 (FIG. 1) supported adjacent the lower section of the compartment 262. Adjacent the upward section of the compartment 262, a remotely operated mechanical arm 336 is arranged on a pair of tracks and supports 338 which respectively are secured to the opposing surfaces of the adjacent concrete partitions 276 and 282. The mechanical arm 336, of known design, can be employed, for example, in remote maintenance of equipment within the region III compartment 262 and is operated by suitable controls extending through the partition 282 and into the chamber 326.

As pointed out in connection with FIGS. 3 to 5 of the drawings, the access corridors serve the additional function of providing an accessible area through which various piping and electrical connections, as indicated generally by the reference character 340, are extended between various portions of the nuclear plant. In this manner, the aforesaid connections, which do not require shielding, are disposed for easy accessability for maintenance or operating personnel entering the access corridors during operation of the plant.

Each of the top openings of the compartments are closed by a suitable biologically shielding cover as better shown in FIG. 8 of the drawings. Each of these covers, for an example the cover 341, enclosing the compartment 272 is provided with a pair of lifting hooks 344 whereby the lifting crane arrangement 144 can raise each of the covers. Due to the weight involved, the cover 341 in this example is provided in two discrete layers 342 and 343 for structural strength and for ease of handling. Upon removing the cover 341, the equipment contained within the cell 272 can be removed or serviced if desired by means of the overhead crane 144. The same is true of the other compartments described heretofore each of which is furnished with one or more lids or covers.

In this example of the invention, some of the reactor equipment is arranged into one or more packaged units indicated generally by the reference character 346 and mounted within the cell 272. These packaged units are coupled into the reactor system in the manner presently to be described and thus are adapted each for installation and removal as a single unit. This latter arrangement not only saved considerable time when initially assembling the reactor plant, and in the subsequent maintenance thereof, but in addition permits installation and removal of the packaged unit, by means of the overhead crane 144, with a minimum of personnel exposure to radiation.

At least two of each of the aforesaid packaged units are provided with the spare unit being held in reserve until one or more of the package units requires maintenance or servicing. The packaged unit then is withdrawn from the plant and the spare unit substituted therefore in order to minimize shut-down time. The unit to be maintained or serviced is then removed to a hot cell or shielded compartment exterior to the reactor plant where it is disassembled by remote methods. Further, in accordance with the invention, the equipment making up each of the aforesaid units, are selected such that the attendant radioactivity associated therewith after the nuclear plant has been in operation for a substantial time, is approximately equal. Where a plurality of packaged units are employed they are of course distributed among the compartments of the plant arrangement of FIGS. 6 to 8 in accordance with the type and level of radioactivity associated with each packaged unit.

Figure 9:
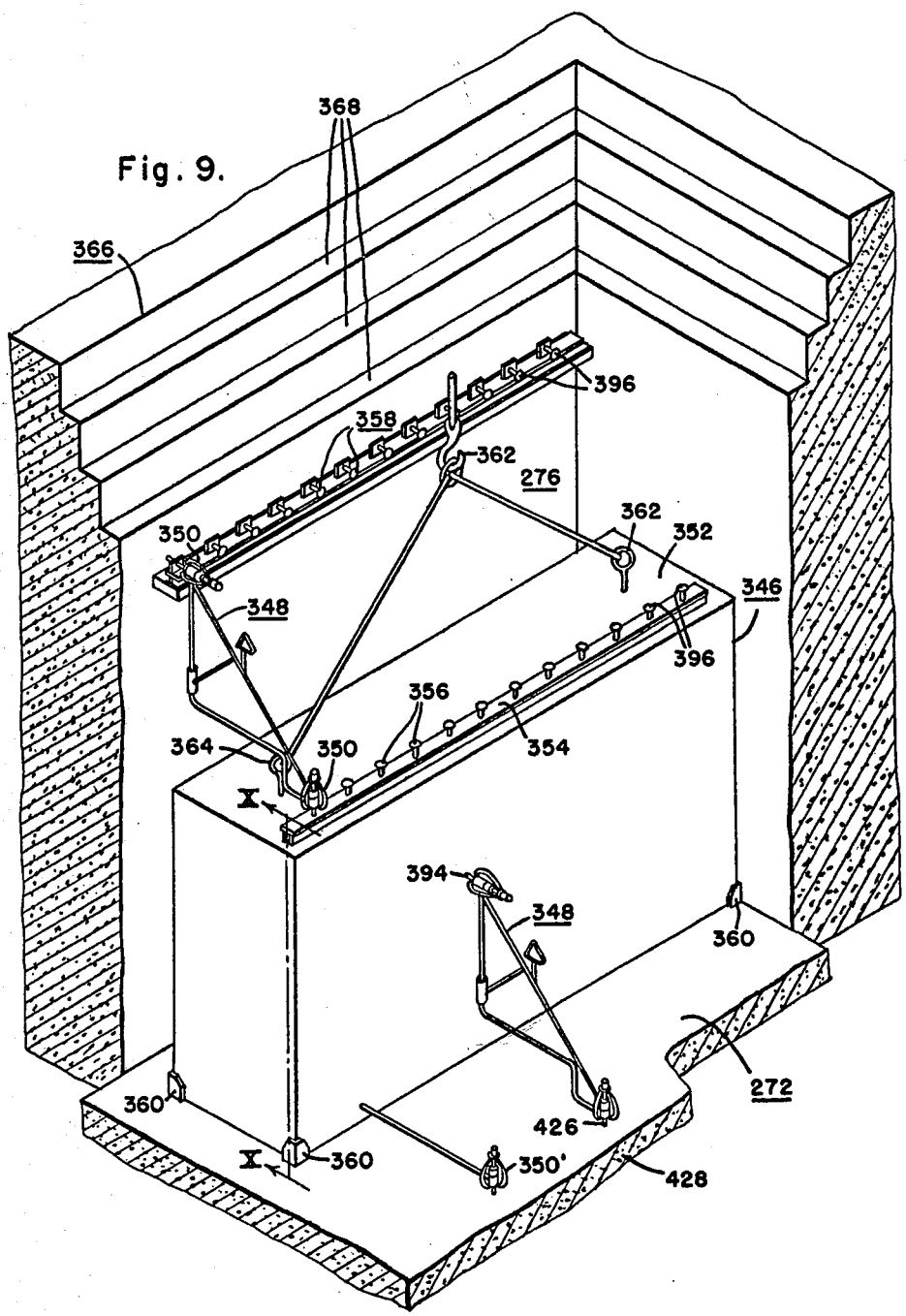
FIG. 9 is a perspective view of a packaged equipment unit mounted in an equipment compartment of one of the aforesaid exemplary plant arrangements with a portion of the adjacent shielding cell walls having been broken away for illustrational purposes.
Figure 10:
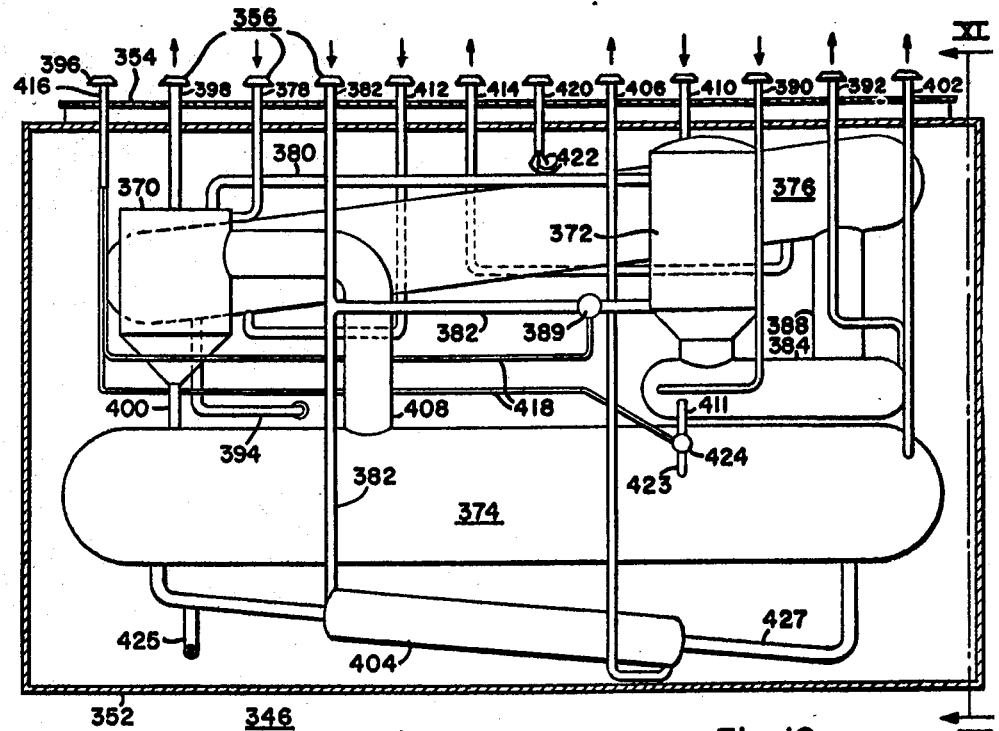
FIG. 10 is a longitudinally sectional view of the packaged unit illustrated in FIG. 9 and taken generally along reference lines X—X thereof.
Figure 11:
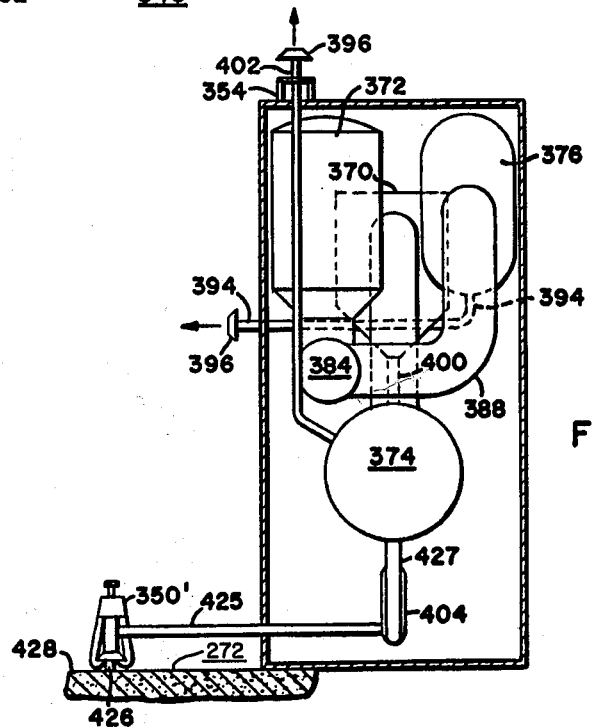
FIG. 11 is a cross-sectional view of the packaged unit shown in FIG. 10 and taken along reference lines XI—XI thereof.

Referring now to FIGS. 9 to 11 of the drawings, an illustrative one of the aforementioned packaged equipment units is shown therein. In this example of the invention, the packaged unit includes the aforesaid recombining unit, liquid entrainment separator, and related equipment discussed heretofore in connection with FIGS. 1 and 2. As better shown in FIG. 9 of the drawings, the fluid and instrumentational connections to the packaged unit 346 are coupled by a series of jumpers 348 to the ends of which are secured a pair of individual remotely operable coupling members 350. Two only of the jumpers 348 are shown in FIG. 9, for illustrational purposes. The coupling members 350 are of known design and are operable by means of a long-handled impact means (not shown) or other suitable remotely operated mechanism.

In furtherance of this purpose, substantially all of the piping and instrumentational connections of the packaged unit 346 are brought out the top of a casing 352 of the packaged unit 346 in this example and desirably are assembled and supported in spaced array along a bracket 354 secured to the top surface of the casing 352. These connections, indicated generally by reference character 356, correspond in position to similar connections 358 mounted within the compartment 272. The order and spacing of the latter-mentioned connections is made substantially the same as the packaged unit connections 356, to facilitate coupling the respective jumpers 348 thereto. Moreover, the connections 358 are mounted within the compartment 272 for an example, on the shielding wall 276 thereof at a distance appropriate for the interposition of the aforesaid remotely operated jumpers 348, which are arranged as shown in FIG. 9 to couple opposing ones of the connections 356 and 358. The casing 352 desirably is provided with relatively large openings (not shown) on each side thereof to permit access to the individual items of equipment mounted in the casing.

To aid in properly positioning a packaged unit 346, guide or locating means 360 is secured to the floor 428 of the compartment 272 at each of the lower corner positions of the casing 352. Therefore, upon lowering the packaged unit 346, for an example, by means of a crane hook 362 secured to the overhead crane 144 and lifting eye hooks 364 secured to the top of the casing 352, the packaged unit 346 is guided to its proper position relative to the reactor plant connections 358 mounted as aforesaid within the compartment 272. In this example of the invention, the packaged unit 346 can be raised and lowered relative to the compartment 272 through a top opening 366. The opening 366 is provided with a plurality of offset surfaces 368 which cooperate with complementarily disposed offset surfaces of the aforementioned compartment cover 342 to prevent radiation streaming through the junction therebetween.

As better shown in FIGS. 10 and 11 of the drawings, the packaged unit 346 comprises, in this example of the invention, a liquid entrainment separator 370, a radiolytic gas recombining unit 372, an evaporator 374, and a condenser 376. The gases removed by each of the gas separators 30 (FIGS. 1 and 2) together with amounts of entrained fluid fuel, or in this case the circulating slurry, enter the packaged unit 346 through conduit 378 which is coupled to the liquid entrainment separator 370. The entrainment separator 370 is fabricated in the form of a cyclone separator of known design and accordingly, further description thereof is not deemed necessary. The vapor, radiolytic gases, and fission gases evolved from the separator 370 are fed through a conduit 380 to the recombining unit 372. In this unit, the radiolytic gases, deuterium and oxygen are chemically recombined by means of a suitable catalyst, for example platinum, to reform heavy water or deuterium oxide vehicle. The heat required to initiate this reaction, is furnished by a steam line 382, which is shut-off after the reaction starts by valve 389.

The output of the recombiner is fed downwardly into a heat exchanger 384 coupled thereto and thence to the condenser 376 through a relatively large conduit 388. The heat exchanger 384 is coupled in this system in order to scavenge the heat produced by the exothermic deuterium-oxygen reaction within the recombiner 372. In furtherance of this purpose, a heat exchanging medium consisting, in this example, of the slurry vehicle, deuterium oxide, is circulated through the heat exchanger 384 by means of the inlet and outlet conduits 390 and 392, respectively.

The condensed deuterium oxide from the condenser 376 is conducted out of the packaged unit 346 by means of a conduit 394 exiting through the side of the casing 352. The conduit 394 is provided with a flanged outer end 396 (FIG. 11) as are all the external connections 356 of the packaged unit and the reactor plant connections 358 to facilitate coupling these conduits to the jumpers 348. The uncondensed gases are exited from the condenser 376 through a conduit 398 which, when coupled to the appropriate one of the connections 358, conducts the uncondensed or fission gases issuing from the condenser to the aforementioned charcoal beds associated with the off gas system 90 (FIG. 2).

The entrained slurry portions removed by the separator 370, are transferred to the evaporator 374 by means of a conduit 400 coupled therebetween. Within the evaporator 374, this liquid is concentrated to the approximate consistency of the circulating nuclear fuel and is returned to one of the primary circulating loops through a conduit 402. The necessary heat for the evaporational process is furnished by means of a heat exchanger 404 to which heat is supplied by steam circulating through the conduit 382, and the spent stream is removed by means of another conduit 406. The evaporated portion of the material fed to the evaporator 374 is conducted to the entrainment separator 370 through a conduit 408, where the evaporated portion is mixed with the separated gases issuing from the separator 370, in order to dilute the radiolytic gases, deuterium and oxygen before recombining the same. This mixing lessens the rapidity of the chemical reaction between these gases in the recombining unit 372.

The uncondensed gases remaining within the condenser 376 are swept out by a quantity of helium from an external source and conducted into the condenser 376 through a conduit 410. The helium together with the uncondensed gases are then exited to the off-gas system 90, as aforesaid.

Cooling water for the condenser 376 is supplied to the packaged unit by means of inlet and outlet conduits 412 and 414 respectively. Of the remaining conduits having connections at the top of the packaged unit 346, the conduit 416 comprises a number of pneumatic or hydraulic leads 418 adapted for operating valves 389 and 424 associated with the separating and recombining system included within the packaged unit 346. The remaining conduit 420 contains necessary electrical leads indicated generally by the reference character 422 for the instrumentation and recording devices employed with the packaged unit.

When desired the heat exchanger 384 and associated equipment can be drained into the evaporator 374 through a conduit 423 having a valve 424. Drainage for the entire system then is afforded by a conduit 425 coupled to the heating leg 427 of the evaporator 374 and extending through the wall of a casing 352 where it terminates in this example in a permanently connected coupling 350' (FIGS. 9 and 11). When the packaged unit is in position such as that indicated in FIGS. 9 and 11 of the drawings, the coupling 350' can be secured to a flanged drainage connection 426 extending through the floor 428 of the compartment 272 (FIGS. 9 and 11).

As indicated heretofore, the system described herein in connection with the packaged unit 346 is only exemplary in nature. In this example of the invention, the components of the packaged unit 346 have been grouped more or less as to system and as to level and type of associated radioactivity. However, this equipment can be grouped additionally as to function, frequency of maintenance, or any combination of the aforesaid characteristics. When grouped in this fashion, as contemplated by the invention, several items of equipment within the packaged unit 346 are served by a single external connection with all of the external connections being arranged to facilitate rapid decoupling and to require a minimum of plant space.

In view of the foregoing, it will be apparent that novel and efficient radioactive plant arrangements have been disclosed herein. The plant layout has been arranged to facilitate maintenance and shielding thereof and to provide safer and more rapid replacement of certain systems associated with the plant. Additionally, the plant is arranged, even when employed in conjunction with a homogeneous reactor system, for the admittance of maintenance or operating personnel to certain areas of the plant when in operation. Although the invention has been described, for illustrative purposes, in connection with a homogeneous reactor system, obviously the plant arrangement can be adapted for many applications employing radioactive materials.

Therefore, numerous modifications will occur to those skilled in the art without departing from the spirit and scope of the present invention. Moreover, it is to be understood that certain features of the invention can be employed without the corresponding use of other features.

Therefore, what is claimed as new is:

1. A plant arrangement for use in handling radioactive materials, processes, and the like, said arrangement including a sealed vapor container, at least one equipment compartment disposed within said container and spaced therefrom, said compartment having biologically shielding walls enclosing said compartment so that the remaining interior areas of said container are substantially shielded from said compartment, a biologically shielding generally tubular enclosure secured to the outer surface of at least one wall of said compartment but spaced interiorly of said vapor container, said enclosure and said one compartment wall defining an access corridor extending through said enclosure, biologically shielding entrance means extending through a wall portion of said container and joined in communication with said enclosure for entering said access corridor, and biologically shielding access means mounted in said one compartment wall and disposed to extend into an adjacent portion of said enclosure for providing access to said compartment from said corridor, said access corridor being biologically shielded from the interior of said compartment at least by the adjacent shielding walls thereof and from remaining interior areas of the container by said shielding tubular enclosure.

2. A plant arrangement for use in handling radioactive materials, processes and the like, said arrangement including a sealed vapor container, at least one equipment compartment disposed within said container and spaced therefrom, said compartment having biologically shielding walls enclosing said compartment so that the remaining interior areas of said container are substantially shielded from said compartment, a biologically shielding generally tubular enclosure secured to the outer surface of at least one of said shielding walls but spaced interiorly of said vapor container, said enclosure and said shielding wall outer surface generally defining an access corridor extending through said enclosure, a sealed tubular member closely fitted within said enclosure for sealing the inner wall surfaces of said corridor so that said corridor is sealed from the atmospheres of said compartment and of said remaining interior areas of the vapor container, biologically shielding entrance means extending through adjacent wall portions of said container and of said enclosure, and joined in communication with said tubular member for entering said access corridor, biologically shielding access means mounted in said one shielding wall outer surface and disposed to extend into the adjacent portions of said enclosure and said tubular member for providing access from said corridor to said compartment, said corridor being shielded from said compartment by the adjacent shielding walls thereof and from said remaining interior areas of the container by said shielding tubular enclosure.

3. A plant arrangement for use in conjunction with a nuclear power system, said arrangement including a sealed vapor container, at least two equipment compartment means disposed within said container and spaced therefrom, said power system including a nuclear reactor disposed in one of said compartment means and at least one primary cooling loop therefor disposed in other of said compartment means, said compartment means having biologically shielding walls enclosing each compartment means so that said compartment means are mutually shielded and so that the remaining interior areas of said vapor container are substantially shielded from said compartment means, a generally tubular biologically shielding enclosure secured to the outer surfaces of the outer shielding walls of at least said cooling loop compartment means but spaced interiorly of said vapor container, said enclosure and said shielding wall outer surface generally defining an access corridor extending through said enclosure, a sealed tubular element closely fitted within said enclosure for sealing the inner wall surfaces thereof so that said access corridor is sealed from the atmospheres of said compartment means and of said remaining interior areas of the vapor container, a biologically shielding tubular entrance means extending through adjacent wall portions of said vapor container and of said enclosure, said entrance means being coupled in communication with said tubular element and said access corridor for entering said access corridor, biologically shielding access means mounted in said adjacent shielding wall outer surfaces and disposed to extend into said enclosure and tubular element for providing access from said corridor to at least said cooling loop compartment means, the shielding walls of at least said reactor compartment means having biologically shielding blowout passage means extending exteriorly at a position spaced from said tubular enclosure but coupling said reactor compartment means with other interior areas of said vapor container, said corridor being shielded from the interior of said compartment means by the adjacent shielding walls thereof and from said blow-out passage means and the remaining interior areas of the container by at least said shielding tubular enclosure.

4. A plant arrangement for use in handling radioactive materials, processes and the like, said arrangement including a sealed vapor container, at least one equipment compartment disposed within said container and spaced therefrom, said compartment having biologically shielding walls enclosing said compartment so that the remaining interior areas of said container are substantially shielded from said compartment, a biologically shielding generally tubular enclosure secured to the outer surface of at least one of said shielding walls but spaced interiorly of said vapor container, said enclosure and said shielding wall outer surface generally defining an access corridor extending through said enclosure, a sealed tubular member closely fitted within said enclosure for sealing the inner wall surfaces of said corridor so that said corridor is sealed from the atmospheres of said compartment and of said remaining interior areas of the vapor container, biologically shielding entrance means extending through adjacent wall portions of said container and of said enclosure and communicating with said tubular member for entering said access corridor, biologically shielding access means mounted in said one shielding wall outer surface and disposed to extend into the adjacent portions of said enclosure and said tubular member for providing access from said corridor to said compartment, said corridor being shielded from said compartment by the adjacent shielding walls thereof and from said remaining interior areas of the container by said shielding tubular enclosure, said tubular member being formed from material having greater rupture strength than that of said vapor container so that said tubular member is capable of withstanding at least that pressure which is just sufficient to rupture said vapor container.

5. A plant arrangement for use in handling radioactive materials, processes and the like, said arrangement including a sealed vapor container, a plurality of equipment compartments disposed within said container and spaced therefrom, said compartments having biologically shielding walls enclosing said compartments so that said compartments are mutually shielded from one another and that the remaining interior areas of said container are substantially shielded from said compartments, a biologically shielding generally tubular enclosure secured to the outer surface of at least one wall of each of said compartments but spaced interiorly of said vapor container, said enclosure and said one compartment walls defining an access corridor extending through said enclosure, said enclosure extending continuously across at least the adjacent wall surfaces of said compartments, biologically shielding entrance means extending through a wall portion of said container and joined in communication with said enclosure for entering said access corridor, and biologically shielding access means mounted in said one compartment wall of each compartment and disposed to extend into adjacent portions of said enclosure for providing access to each of said compartments from said corridor, said access corridor being biologically shielded from the interior of each of said compartments at least by the adjacent shielding walls thereof and from said remaining interior areas of the container by said shielding tubular enclosure.

6. A plant arrangement for use in handling radioactive materials, processes and the like, said arrangement including a sealed vapor container, at least one equipment compartment disposed within said container and spaced therefrom, said compartment having biologically shielding walls enclosing said compartment so that the remaining interior areas of said container are substantially shielded from said compartment, a biologically shielding generally tubular enclosure secured to the outer surface of at least one of said shielding walls but spaced interiorly of said vapor container, said enclosure and said shielding wall outer surface generally defining an access corridor extending through said enclosure, a sealed tubular member closely fitted within said enclosure for sealing the inner wall surfaces of said corridor so that said corridor is sealed from the atmospheres of said compartment and of said remaining interior areas of the vapor container, biologically shielding entrance means extending through adjacent wall portions of said container and of said enclosure, and joined in communication with said tubular member for entering said access corridor, biologically shielding access means mounted in said one shielding wall outer surface and disposed to extend into the adjacent portions of said enclosure and said tubular member for providing access from said corridor to said compartment, said corridor being shielded from said compartment by the adjacent shielding walls thereof and from said remaining interior areas of the container by said shielding tubular enclosure, and conduit means communicating with said tubular member and extending through adjacent wall portions of said vapor container and of said tubular enclosure for circulating air directly through said tubular member and said corridor from a source of said air located exteriorly of said vapor container.

7. A plant arrangement for use in handling radioactive materials, processes and the like, said arrangement including a sealed vapor container, at least one equipment compartment disposed within said container and spaced therefrom, said compartment having biologically shielding walls enclosing said compartment so that the remaining interior areas of said container are substantially shielded from said compartment, a biologically shielding generally tubular enclosure secured to the outer surface of at least one of said shielding walls but spaced interiorly of said vapor container, said enclosure and said shielding wall outer surface generally defining an access corridor extending through said enclosure, a sealed tubular member closely fitted within said enclosure for sealing the inner wall surfaces of said corridor so that said corridor is sealed from the atmospheres of said compartment and of said remaining interior areas of the vapor container, biologically shielding entrance means extending through adjacent wall portions of said container and of said enclosure and communicating with said tubular member for entering said access corridor, biologically shielding access means mounted in said one shielding wall outer surface and disposed to extend into the adjacent portions of said enclosure and said tubular member for providing access from said corridor to said compartment, said corridor being shielded from said compartment by the adjacent shielding walls thereof and from said remaining interior areas of the container by said shielding tubular enclosure, and conduit means communicating with said tubular member and extending through adjacent wall portions of said vapor container and of said tubular enclosure for circulating air directly through said tubular member and said corridor from a source of said air located exteriorly of said vapor container, said tubular member being formed from material having greater rupture strength than that of said vapor container so that said tubular member is capable of withstanding at least that pressure which is just sufficient to rupture said vapor container.

8. A plant arrangement for use in handling radioactive materials, processes, and the like, said arrangement including a sealed vapor container, at least one equipment compartment disposed within said container and spaced therefrom, said compartment having biologically shielding walls enclosing said compartment so that the remaining interior areas of said vapor container are substantially shielded from said compartment, a biologically shielding generally tubular enclosure secured to the outer surface of at least one of said shielding walls but spaced interiorly of said vapor container, said enclosure and said shielding wall outer surface generally defining an access corridor extending through said enclosure, a sealed tubular member closely fitted within said enclosure for sealing the inner wall surfaces of said corridor so that said access corridor is sealed from the atmospheres of said compartment and of said remaining interior areas of the vapor container, conduit means communicating with said tubular member and extending through adjacent wall portions of said vapor container and of said tubular enclosure for circulating ventilating air directly through said tubular member and said corridor from a source of said air located exteriorly of said vapor container, a pair of biologically shielding tubular entrance members coupled to said enclosure and to said container respectively, said entrance members extending through adjacent wall portions of said vapor container and of said tubular enclosure respectively and being coupled in communication with one another and with said tubular member for entering said access corridor, a pair of sealed tubular segments closely fitted within said entrance members respectively, biologically shielding access means mounted in said one shielding wall outer surface and disposed to extend into the adjacent portions of said encosure and said tubular member for providing access from said corridor to said compartment, said corridor being shielded from the interior of said compartment by the adjacent shielding walls thereof and from said remaining interior areas of the container by said shielding tubular enclosure, and biologically shielding expansion joint means coupling said entrance members together and said tubular segments together respectively.

9. A plant arrangement for use in conjunction with a nuclear power system, said arrangement including a sealed vapor container, at least two equipment compartment means disposed within said container and spaced therefrom, said power system including a nuclear reactor disposed in one of said compartment means and at least one primary cooling loop therefor disposed in other of said compartment means, said compartment means having biologically shielding walls enclosing each compartment means so that said compartment means are mutually shielded and so that the remaining interior areas of said vapor container are substantially shielded from said compartment means, a generally tubular biologically shielding enclosure secured to the outer surfaces of the outer shielding walls of at least said cooling loop compartment means but spaced interiorly of said vapor container, said enclosure and said shielding wall outer surface generally defining an access corridor extending through said enclosure, a sealed tubular element closely fitted within said enclosure for sealing the inner wall surfaces thereof so that said access corridor is sealed from the atmospheres of said compartment means and of said remaining interior areas of the vapor container, a biologically shielding tubular entrance means extending through adjacent wall portions of said vapor container and of said enclosure, said entrance means being coupled in communication with said tubular element and said access corridor for entering said access corridor, biologically shielding access means mounted in said adjacent shielding wall outer surfaces and disposed to extend into said enclosure and tubular element for providing access from said corridor to at least said cooling loop compartment means, the shielding walls of at least said reactor compartment means having biologically shielding blow-out passage means extending exteriorly at a position spaced from said tubular enclosure but coupling said reactor compartment means with other interior areas of said vapor container, said tubular element being formed from material having greater rupture strength than that of said vapor container so that said tubular element is capable of withstanding at least that pressure which is just sufficient to rupture said vapor container, said corridor being shielded from the interior of said compartment means by the adjacent shielding walls thereof and from said blow-out passage means and the remaining interior areas of the container by at least said shielding tubular enclosure, and conduit means communicating with said tubular element and extending through adjacent wall portions of said vapor container and of said enclosure for circulating ventilating air directly through said corridor and said tubular element from a source of said air located exteriorly of said vapor container.

References Cited in the file of this patent

UNITED STATES PATENTS

| Re. 21,470 | White | May 28, 1940 |
| 2,725,993 | Smith | Dec. 6, 1955 |
| 2,869,749 | Arne et al. | Jan. 20, 1959 |

OTHER REFERENCES

Problems in Nuclear Energy (edited by Hughes et al.), vol. 1, pages 271, 272, 274, Permagon Press, 1957.

Nucleonics, vol. 13 (June 1955), page 53.

Proceedings of the International Conference on the Peaceful Uses of Atomic Energy, August 8–20, 1955, vol. 2, pages 310, 311; vol. 14, pages 122, 123, 126, 127.

Goodman: The Science and Engineering of Nuclear Power, vol. I, page 318, Addison-Wesley Press, 1947.

TID–5275, Research Reactors, U.S. Government Printing Office, 1955, pages 85 and 402–405.

Proceedings of the International Conference on the Peaceful Uses of Atomic Energy, August 8–20, 1955, vol. 3, pages 96 and 195; vol. 14, pages 124–125 and 133–134.

TID–5276, Chemical Processing and Equipment, U.S. Government Printing Office, 1955, pages 19, 22.

Power, vol. 99 (September 1955), pages 75–81.

Nucleonics, vol. 13 (June 1955), page 52.